United States Patent [19]
Iba et al.

[11] Patent Number: 5,835,766
[45] Date of Patent: Nov. 10, 1998

[54] SYSTEM FOR DETECTING GLOBAL DEADLOCKS USING WAIT-FOR GRAPHS AND IDENTIFIERS OF TRANSACTIONS RELATED TO THE DEADLOCKS IN A DISTRIBUTED TRANSACTION PROCESSING SYSTEM AND A METHOD OF USE THEREFORE

[75] Inventors: Hiroiku Iba, Kobe; Hiroaki Ito; Yasuhiko Hashizume, both of Kawasaki, all of Japan

[73] Assignee: Fujitsu Limited, Kawasaki, Japan

[21] Appl. No.: 545,207

[22] Filed: Oct. 19, 1995

[30] Foreign Application Priority Data

Nov. 4, 1994 [JP] Japan .................................. 6-271562

[51] Int. Cl.⁶ ........................................................ G06F 9/00
[52] U.S. Cl. .............................................. 395/679; 707/8
[58] Field of Search ................................... 395/650, 610,
395/671, 674, 672; 364/969, 974.7; 707/8, 10

[56] References Cited

U.S. PATENT DOCUMENTS 5,504,899  4/1996  Raz ........................................ 395/650
5,504,900  4/1996  Raz ........................................ 395/650

OTHER PUBLICATIONS

CAE Specification, *Distributed Transaction Processing: The XA Specification*, Dec. 1991, pp. 1–80, X/Open Company, Ltd.

Primary Examiner—Majid A. Banankhan
Attorney, Agent, or Firm—Staas & Halsey

[57] ABSTRACT

In a distributed transaction processing system, deadlocks generated between global transactions so as to stretch over a plurality of resource managers which access database can be detected, thus aiming at effective use of resources. For this reason, the system is configured in such a manner that a transaction manager for collectively managing global transactions is provided with global deadlock detector for detecting deadlocks generated so as to stretch over a plurality of resource managers between a plurality of global transactions which result from wait-for relation as to occupation of hardware resources.

15 Claims, 25 Drawing Sheets

T2 IS WAITING FOR T1
T3 IS WAITING FOR T1
T4 IS WAITING FOR T1
T5 IS WAITING FOR T3
T6 IS WAITING FOR T3

TRANSITION FROM THIS STATE TO THE STATE WHICH T1 WAITS WAIT FOR ANY OF T2 – T6 LEADS TO A DEADLOCK

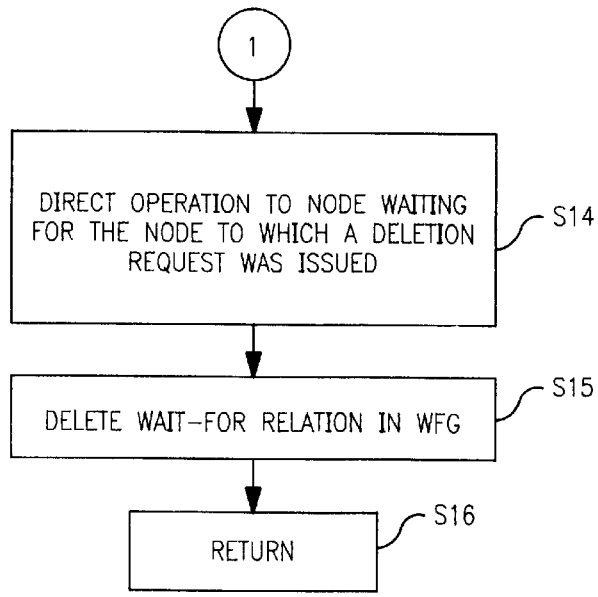
FIG. 12
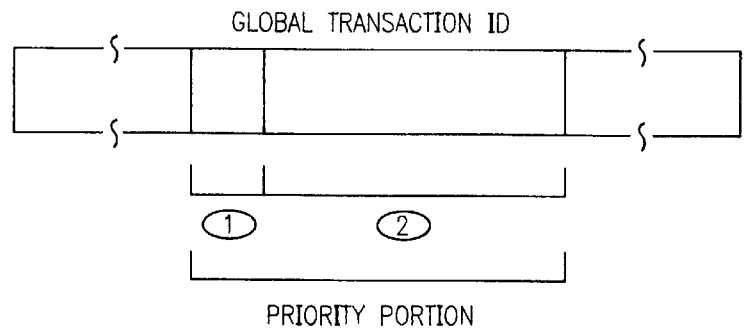
FIG. 13A
FIG. 13B

EXPANSION OF LOCKING RANGE : FUNCTION BY WHICH TRANSACTION LOCKING ▮ PORTION CAN LOCK ▭ PORTION WHILE RETAINING LOCK OF ▮ PORTION

REDUCTION OF LOCKING RANGE : FUNCTION BY WHICH TRANSACTION LOCKING ▮ PORTION CAN UNLOCK EXCEPT ▭ PORTION

| Tixm WAITS FOR Tjxn | MANAGEMENT BY GLOBAL DEADLOCK DETECTOR |
|---|---|
| Tixm WAITS FOR xn | MANAGEMENT BY LOCAL DEADLOCK DETECTOR |
| xm WAITS FOR Tjxn | MANAGEMENT BY LOCAL DEADLOCK DETECTOR |
| xm WAITS FOR xn | MANAGEMENT BY LOCAL DEADLOCK DETECTOR |

Tixm•Tjxn : TRANSACTION BRANCH UDER THE CONTROL OF GLOBAL TRANSACTION
xm•xn : TRANSACTION TO BE PROCESSED BY RM ITSELF

FIG. 18A

| DEADLOCK BETWEEN Tixm | DETECTION BY GLOBAL DEADLOCK DETECTION |
|---|---|
| DEADLOCK FORMED BY Tixm AND xn | DETECTION BY LOCAL DEADLOCK DETECTION |
| DEADLOCK BETWEEN Xns | DETECTION BY LOCAL DEADLOCK DETECTION |

FIG. 18B

SYSTEM FOR DETECTING GLOBAL DEADLOCKS USING WAIT-FOR GRAPHS AND IDENTIFIERS OF TRANSACTIONS RELATED TO THE DEADLOCKS IN A DISTRIBUTED TRANSACTION PROCESSING SYSTEM AND A METHOD OF USE THEREFORE

BACKGROUND OF THE INVENTION

1. Field of the Invention

The present invention relates to a system of detecting deadlocks generated so as to stretch over a plurality of resource managers between global transactions in a distributed transaction processing system for executing transaction processing such as updating information stored in a database in response to a user's request in a distributed computing environment and a method of performing the same.

2. Description of the Related Arts

A processing form in a computer, for updating information stored in a database in response to requests from a large number of users such as, for example, reservation of an airplane ticket, or withdrawal of money from a bank account is called "transaction processing".

Adopted in the initial development stage of the transaction processing is a centralized type system in which an entire processing is controlled by one computer. However, there have arisen problems such as limitations on expandability of a system followed by an increase in an amount of processing, and diversification of processing requests and thus processing in distributed processing environment, i.e., transition to a distributed transaction processing environment has been in progress.

The distributed transaction processing has begun to be standardized in several application fields. One of them is a standardization by X/Open, which is an international standardization body with respect to the open system(UNIX). In the explanation which will be described later, the present invention is described based on a functional model known as a DTP(Distributed Transaction Processing) model.

Prior to explaining deadlocks between global transactions, first a deadlock detection between transactions in a certain system which is not an open system will be explained. FIG. 1 is a block diagram showing an configuration of such a system. As shown in FIG. 1, there are provided, inside a resource manager(RM) 1 for managing resources such as files, a transaction manager(TM) 2 for managing a plurality of transactions, a lock manager(LM) 4 for performing an exclusive control for resources such as files or a shared memory 3. That is, the exclusive control is executed in such a manner that, while a certain transaction is executing processing with occupying a certain file, even when another transaction accesses the file, this transaction which has accessed the file is not immediately made to access the file, and is made to wait to occupy the file. Further provided is an access manager(AM)6 for accessing each of a plurality of files 5.

Provided within the lock manager 4 is a deadlock detector (DD)7 for detecting a deadlock in which wait-for relation between transactions cannot be permanently eliminated, unless the situation is changed. The WFG management table 8 stores wait-for graph (WFG) which shows wait-for relation as to a certain hardware resource between a plurality of transactions. The deadlock detector 7 detects a deadlock using contents of the WFG management table 8 provided inside a shared memory 3.

According to the system shown in FIG. 1, deadlocks are detectable between a plurality of transactions generated inside the resource manager 1. That is, when in a system having one resource manager provided with a plurality of access managers 6, and all transactions managed by the transaction manager 2 access a plurality of files, the lock manager 4 collectively performs exclusive control to occupy hardware resources when accessed. For this reason, the deadlock detector detects without difficulties wait-for relations as to the occupation of hardware resources between a plurality of transactions to be executed inside the resource manager 1.

In a X/Open DPT model, generally a plurality of resource managers are arranged under the control of one transaction manager, and one global transaction can be executed by stretching over a plurality of resource managers. Additionally, respective resource managers can execute a local transaction which is completely executable within itself. Further, a part of a global transaction to be executed by each resource manager is named "transaction branch".

FIG. 2 illustrates a conception of the relation between a global transaction and a branch transaction. As described before, to maintain consistency of transaction branches controlled inside each of a plurality of resource managers, the global transaction collectively controls a plurality of transaction branches.

FIG. 2 shows that the transaction branches G1L1 and G1L2 under the control of the global transaction are executed in different periods of time. In this connection, for example, a transaction branch G1L1 represents a part of the global transaction G1 under the control of the resource manager L1.

Generally, a transaction processing terminates in the form of completion or cancellation of processing. For example, assuming a case where a user wants to book an airplane ticket and make a hotel reservation in advance for a business trip, this transaction processing completes only when both reservations can be accepted. When either an airplane ticket or a hotel reservation, or both can not be booked, generally this transaction is canceled. In the transaction processing, completion of processing is called "commit" and cancellation is called "roll-back" or "abort".

In a DTP model, when a transaction terminates, commitment protocol called two phase-commit is adopted. In FIG. 2, to perform a commit for a global transaction G1, all transaction branches G1L1 and G1L2 under the control thereof are required to be in such a state as to be performed "commit". When even one of all the transaction branches G1L1 and G1L2 cannot be committed, transaction branches are rolled-back and in addition the global transaction itself is rolled-back.

In FIG. 2, when a global transaction wants to perform commit as the procedure of two-phase commitment, the global transaction issues a prepare command to all transaction branches under the control of the global transaction. In response to this prepare command, each transaction branch returns an answer "OK" if it is in a committable state, or an answer "NG" if in an in-committable state.

When all transaction branches return an affirmative answer "OK" in response to the prepare command issued by the global transaction, the global transaction issues a commit command to transaction branches under the control of the global transaction. On the other hand, even if only one of the transaction branches returns a negative answer "NG", the global transaction issues a roll-back command to transaction branches under the control thereof.

Next, with reference to FIG. 3, a conventional deadlock detecting method will be explained in an open system where a global transaction is managed by one transaction manager and global transaction branches are executed by a plurality of resource managers. The open system shown in FIG. 3 comprises one transaction manager(TM)10, three resource managers 11a–11c, and files 12a–12c each accessed by a resource manager.

Provided inside the TM 10 is a shared memory 13 for the TM. Besides, for example, a resource manager RMa11a comprises a local transaction manager LTMa14a, for locally managing transactions including transaction branches executed inside the resource manager, a local access manager LAMa15a for accessing a file 12a, a shared memory 16a, and a local lock manager LLMa17a locally performing an exclusive control as to occupation of the file 12a. Additionally, there are provided inside the LLMa17a a local deadlock detector LDDa18a for locally detecting a deadlock, and there is stored inside the shared memory 16a a WFG management table 19a used for detecting deadlocks by the LDDa18a.

As described above, in the open system based upon DTP model, there exist a plurality of resource managers under one transaction manager. In the X/Open DTP model, a TM and a RM are connected through an XA interface. Thus, one global transaction can be executed by the plurality of RMs as transaction branches, but there is no function provided in the XA interface for detecting deadlocks stretching over resource managers between global transactions. For this reason, it is impossible to detect deadlocks stretching over resource managers between global transactions. Accordingly, in conventional system, with respect to one of the transactions whose processing has substantially been stopped due to a deadlock, its deadlock state can not be eliminated until it is recognized that time-out occurs by monitoring execution time.

The problems as to detecting deadlocks in the open system explained in FIG. 3 will further be detailed hereinafter with reference to FIGS. 4, and 5. The reason why deadlocks stretching over resource managers between global transactions cannot be detected is that a resource manager which perform an exclusive control for hardware resources only perform a closed control within the inside thereof, so that wait-for relation(WFG) as to deadlocks generated between at least two global transactions is managed so as to be divided into a plurality of resource managers. It is impossible to detect deadlocks which occur so as to stretch over resource managers between global transactions.

FIG. 4 illustrates a conventional WFG managing method. In the same figure, like the FIG. 3, a global transaction from an application program 9 is managed by one transaction manager 10 and transaction branches as a part of the global transaction are managed by a plurality of resource managers 11a–11c, respectively. For example, there are provided a local transaction manager LTMa14a and a local lock manager LLMa17a inside the resource manager 11a. Further, inside the LLMa17a there is provided a local dead lock detector LLDa18a. The LDDa18a detects deadlocks using the contents of a WFG management table 19a having wait-for relation set therein between transactions which are due to an exclusive control of resources inside the resource manager.

FIG. 5 illustrates processing in the case where deadlocks cannot be detected between global transactions in a system shown in FIG. 4. By referring to the FIG. 5, deadlocks between global transactions which are requested to be executed by two application programs A and B, will be explained.

In FIG. 5, first an application program A9a requests that TM10 starts global transaction T1 in processing shown by a line marked ①. In response thereto, the TM 10 requires local transaction managers 14a and 14b provided within the two RM11a and 11b to start performing transaction branches T1a1 and T1b1. At almost the same time in processing shown by a line marked ①, an application program B9b requires the TM10 to start global transaction T2 in processing shown by a line marked ②. In the same manner, the TM10 requires the LTM14a and LTM14b to start performing transaction branches T2a2 and T2b2.

After that, it is assumed that the application program A9a requires the resource manager 11a to access the resource 12a in processing shown by a line marked ③, in response to the requirement, the local lock manager LLMa17a provided within its resource manager issues an OK signal indicating permission of occupying the resource 12a, that is, of lock acquisition of resource 12a. In the same manner the application program B9b requires the resource manager 11b to access the resource 12b, and the LLM17b has issued an OK signal which indicates permission of lock acquisition of the resource 12b in processing shown by a line marked ④.

Afterwards, the application program A9a requires the resource manager 11b to access the resource 12b in processing shown by lines marked ⑤, and the lock determination by the LLM17b results in detecting that transaction branch T1b1 waits for T2b2($T_1b_1 \rightarrow T_2b_2$). Next, the LDD18b registers the wait-for relation thus detected with the WFG management table 19b and then determination as to deadlock is made. In this determination, the relation is determined only that the global transaction T1 waits for T2, and it is determined that no deadlock is generated.

At almost the same time as requested by the requirement shown in processing shown by a line marked ⑤, the application program B9b requires the resource manager 11a to access the resource 12a in processing shown by lines marked ⑥. In the same manner, it is detected that the branch transaction T2a2 waits for T1a1 (T2a2→T1a1), and this wait-for relation is registered with the WFG management table 19a, followed by the deadlock determination in which it is determined that no deadlock is generated in the same manner as that described before.

However, examination of wait-for relation between global transactions as an entire system shown in FIG. 5 results in finding that a deadlock has occurred as a whole. That is, the global transaction T2 waits for T1 at the side of the resource manager 11a and T1 waits for T2 at the side of the resource manager 11b. However, since the wait-for relations between transaction branches are separately managed by the two resource managers 11a and 11b, the system itself cannot detect deadlocks between global transactions.

As described above, the problem remains unsolved in the conventional open system, lying in that, when deadlocks are generated so as to stretch over a plurality of resource managers between global transactions, that deadlock cannot be detected, so that until one of transactions contained in the loop formed by the wait-for relation which stands while a deadlock is generating comes to time-out, and then the transaction releases the resources through roll-back processing whose locking has been acquired, thereby having been incapable of achieving effective use of resources.

SUMMARY OF THE INVENTION

The present invention aims to allow deadlocks generated between a plurality of transactions so as to stretch over a plurality of resource managers to be detected, thereby attaining effective use of resources.

The distributed transaction processing system according to the present invention has a transaction manager for collectively managing a plurality of global transactions, a plurality of resource managers for managing a part of each global transaction as transaction branches and accessing hardware resources, and a global deadlock detector, for detecting deadlocks generated due to wait-for relation with respect to occupation of the hardware resources generated so as to stretch over a plurality of the resource managers between global transactions.

The transaction processing system according to the other aspect of the present invention has, a transaction manager for collectively managing a plurality of global transactions, a plurality of resource managers for managing a part of each global transaction as a transaction branch and accessing a hardware resource, a global deadlock detector, for detecting a deadlock which is generated resulting from wait-for relation as for occupation of the hardware resources so as to stretch over a plurality of the resource managers between a plurality of global transactions, and a local deadlock detector for detecting deadlocks between transaction branches executed within each of the resource managers, or local transactions processed within each of the resource managers only.

In addition, when the present invention is applied to a multiprocessor system constituting a plurality of processors, each of the plurality of processors has a transaction manager for collectively managing a plurality of global transactions, a plurality of resource managers for managing a part of each global transaction as a transaction branch to access hardware resource, and a global deadlock detector for detecting deadlocks generated so as to stretch over a plurality of resource managers between global transactions resulting from wait-for relation as to occupation of the hardware resources.

Also, according to the present invention, there is provided a global deadlock detector for detecting deadlocks between a plurality of global transactions executed so as to stretch over a plurality of resource managers, thereby allowing deadlocks to effectively be eliminated and enabling resources which respective resource manager manages to be efficiently utilized.

The global deadlock detector is provided with a wait-for graph. The wait-for graph stores wait-for relation between transactions and is used for detecting a deadlock. Contents of the wait-for graph include an address of a node connected to a self node on a shared memory, each node corresponding to each transaction, and a transaction identifier of the self node. The connection relations of each node correspond to mutual wait-for relation between transactions.

The global deadlock detector traces connection relation between nodes stored in a wait-for graph to determine whether or not the connection relation between nodes form a loop, thereby determining whether or not a deadlock has been generated.

The fact that the connection relation between nodes forms a loop indicates that tracing nodes which causes the self node to be put in the wait-state returns to the self node. For example, now let it assume that transactions A and B have been generated, and transaction A is occupying a resource A, and transaction B is occupying a resource B. Let us further assume that for transactions A and B to process their own transactions, resources B and A are required, respectively. Therefore, transaction A attempts to occupy resource B in addition to resource A and transaction B attempts to occupy resource A in addition to resource B. Transaction A issues an occupation request for occupying resource B after occupying resource A. At almost the same time, resource B issues an occupation request for occupying resource A after occupying resource B. The occupation request issued by transaction A, since resource B has already been occupied by transaction B, is made to put in the wait-state. Whereby, transaction A is put in a stop-state with occupying resource A. Likewise, transaction B, since it cannot occupy resource A, is put in the stop-state.

When the wait-state described above is traced from transaction A, first it is detected that transaction A is waiting for transaction B, and next tracing a transaction, from transaction B, which is a cause of the wait results in being capable of recognizing that transaction B is waiting for transaction A, thus resulting in the fact that transaction A is waiting for self transaction being executed through transaction B and this signifies that a deadlock is being generated. Consequently, the wait-state described above clarifies that a loop is formed starting at transaction A and again returning to transaction A through transaction B. Reversely speaking, if a loop of this kind has not been formed, a deadlock will not be generated.

The global deadlock detector detects the relation described above as deadlocks between global transactions which operates a plurality of resource managers using the contents of the wait-for graph to eliminate the deadlocks.

The further features and advantages of the present invention will be more apparent from the description which will be described in conjunction with the drawings.

BRIEF DESCRIPTION OF THE DRAWINGS

FIGS. 11 and 12 are flowcharts of processing by a global deadlock detectors;

FIGS. 13A and 13B illustrate contents of a priority portion of a global transaction identifier;

FIGS. 18A and 18B illustrate a deadlock detecting method in the second embodiment;

DESCRIPTION OF THE PREFERRED EMBODIMENT

Figure 6:
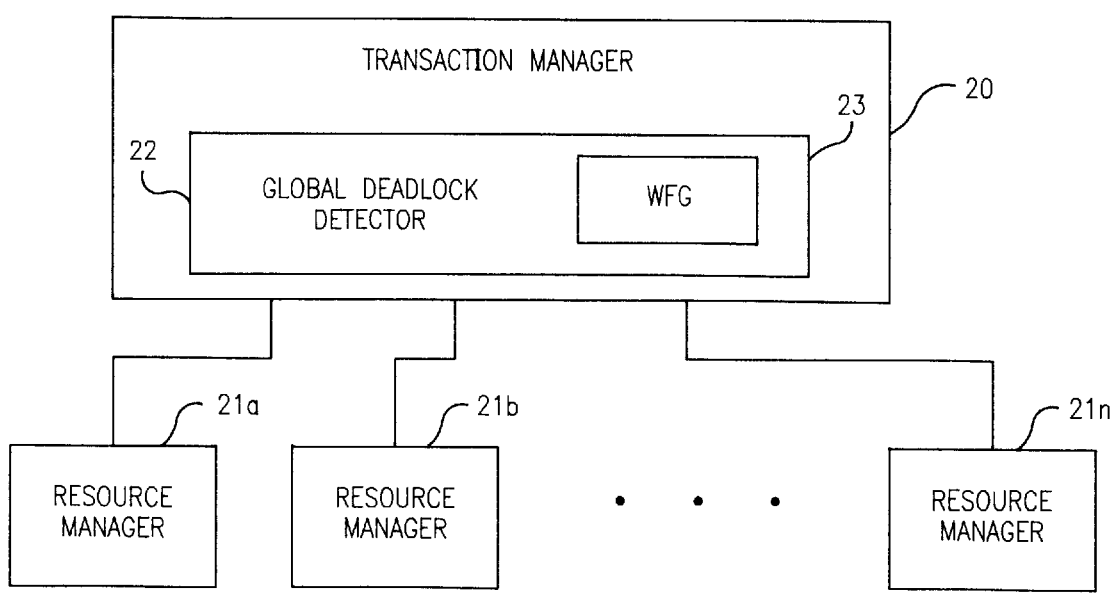
FIG. 6 is a principle block diagram for the first embodiment according to the present invention.

FIG. 6 is a block diagram of a principle configuration according to the first embodiment of the present invention. FIG. 6 is a principle block diagram of a deadlock detecting method between global transactions in a distributed transaction processing system comprising a transaction manager 20 for managing a global transaction, and a plurality of resource managers 21a–21n for managing a part of one global transaction as transaction branches and accessing hardware resources.

In FIG. 6, a transaction manager 20 is provided with a global deadlock detector 22 for detecting a deadlock generated so as to stretch over a plurality of resource managers 21a–21n between a plurality of global transactions. The global deadlock detected by the global deadlock detector 22 represents deadlocks in a wait-for relation as to occupation of hardware resources, that is, a loop generated in an aforementioned wait-for graph. Detecting this loop leads to enabling global deadlocks to be detected.

Figure 7:
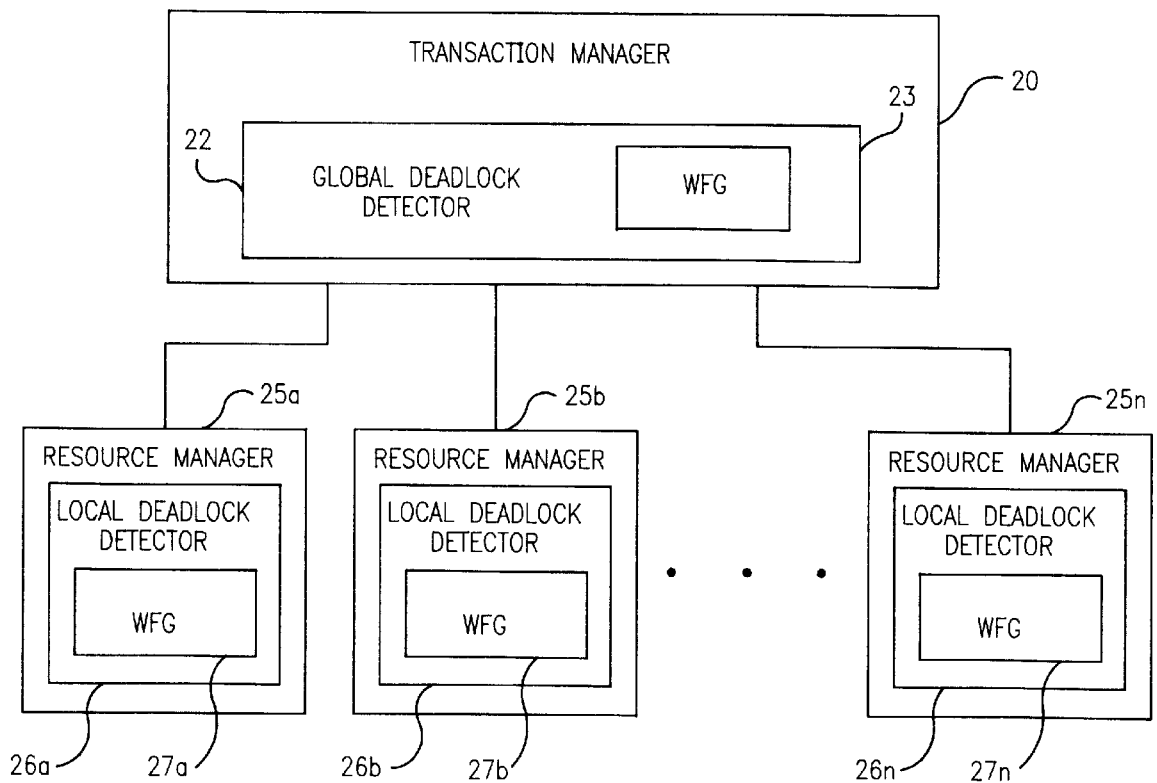
FIG. 7 is a principle block diagram of the second embodiment according to the present invention.

FIG. 7 is a block diagram of a principle configuration according to the second embodiment of the present invention. Like the FIG. 6, FIG. 7 is a principle block diagram for a method of detecting a deadlock between global transactions in a distributed transaction processing system having a transaction manager 20 for managing global transaction, and a plurality of resource managers managing a part of a global transaction as a transaction branch and accessing hardware resources.

(1) The comparison of FIG. 7 to FIG. 6 clarifies the following differences; that is, there are provided inside a plurality of resource managers 25a–25n, local deadlock detectors, 26a–26n for detecting deadlocks among local transactions processed only within each of the resource managers and the transaction branches executed within each of resource managers.

According to FIG. 6 showing a principle of the first embodiment, a wait-for graph(WFG)23 with which wait-for relation is registered as to occupation of hardware resources between a plurality of global transactions in response to a resource acquisition request issued by an application program to hardware resources under the control of the resource manager is provided inside the global deadlock detector 22.

(2) Global deadlocks can be detected by determining whether or not wait-for relation between global transaction form a loop in this graph.

According to FIG. 7 showing a principle of the second embodiment, the global deadlock detector 22 provided inside the transaction manager 20 detects deadlock generated so as to stretch over a plurality of resource managers between global transactions, and simultaneously local deadlocks are detected inside respective resource managers. There are counted deadlocks between transaction branches as a part of a global transaction and a local transaction to be processed inside a resource manager only, deadlocks between local transactions, and deadlocks between global transactions as this local deadlock, and these deadlocks are all detected.

As described above, according to the present invention, wait-for relation between global transactions processed by stretching over a plurality of resource managers are managed by global deadlock detector 22, and deadlocks between global transactions are detected using the contents of the wait-for-graph in which the wait-for-relation are registered.

Figure 4:
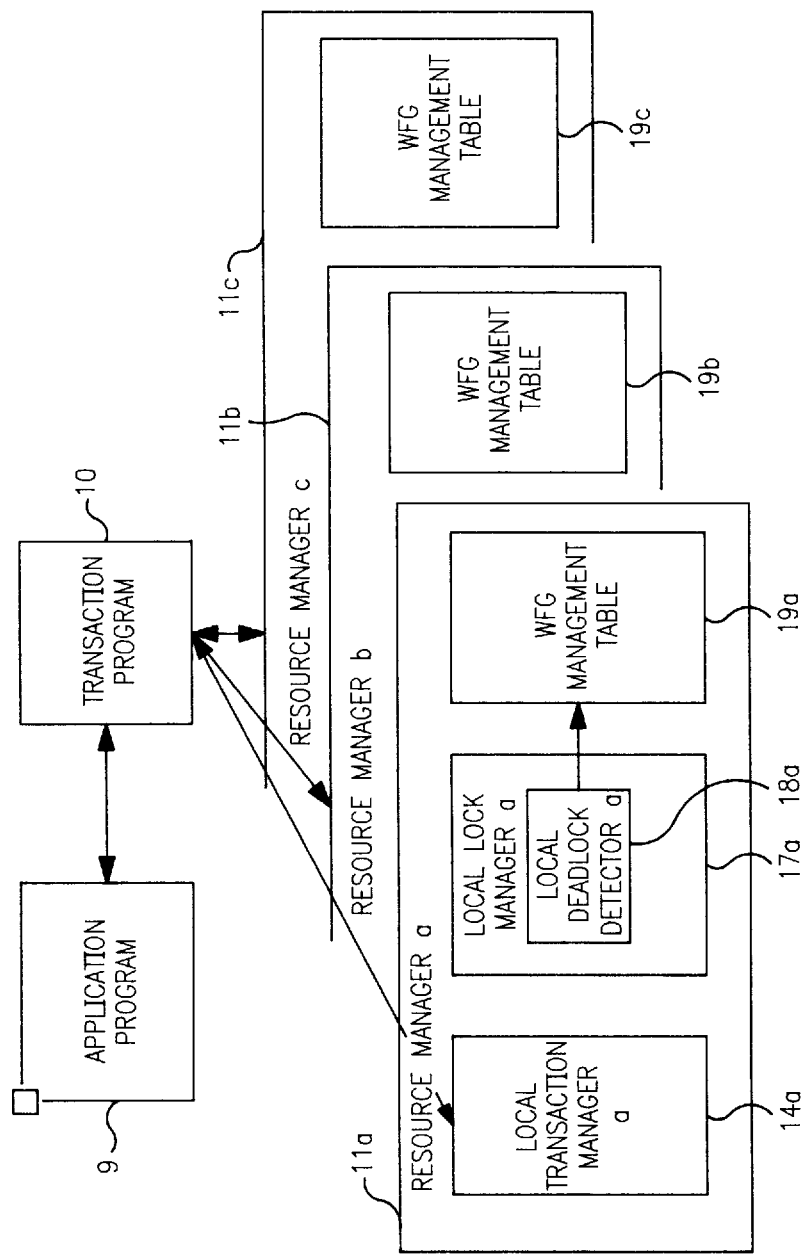
FIG. 4 illustrates a conventional wait-for graph managing method.
Figure 8:
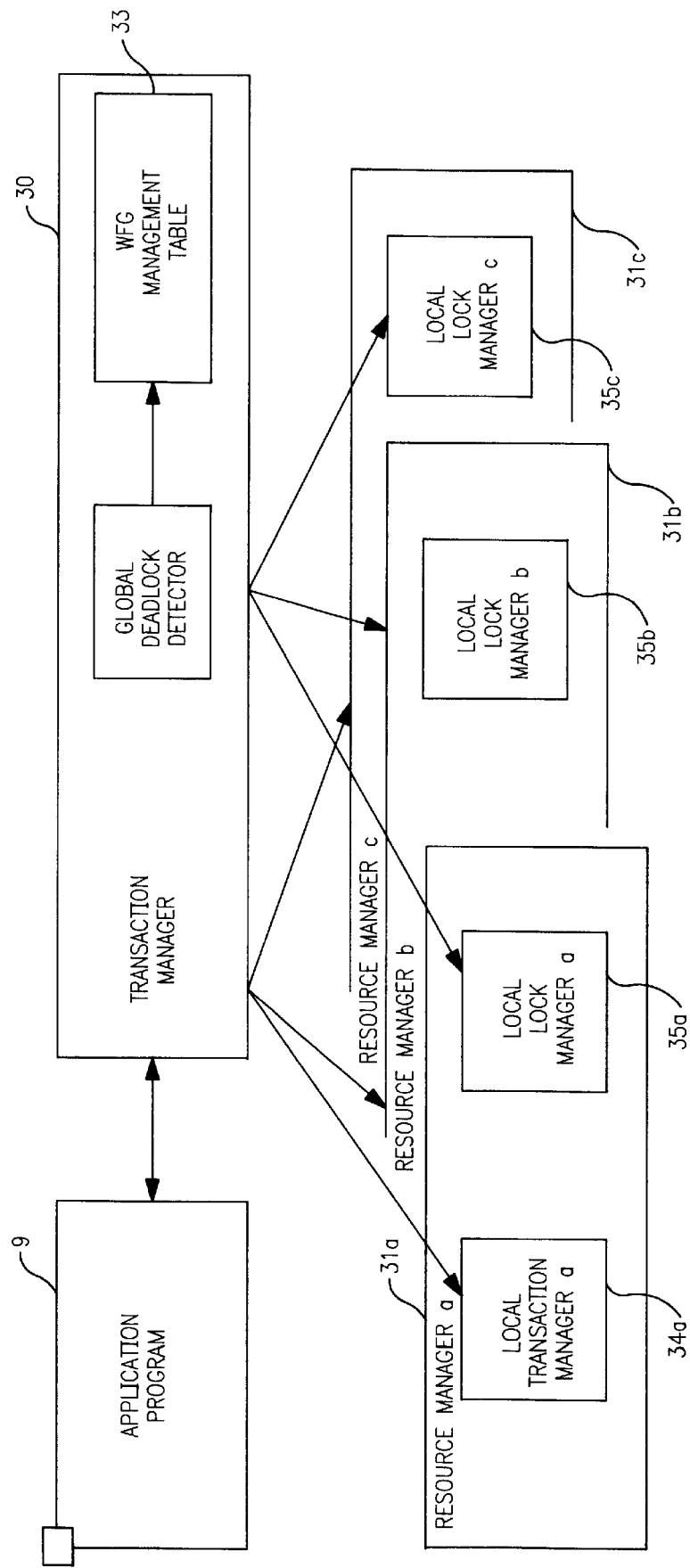
FIG. 8 is a block diagram showing fundamental configuration in a distributed transaction processing system of the first embodiment according to the present invention.

First, the first embodiment will be explained with respect to a case where all transactions processed inside a distributed transaction processing system are global transactions. FIG. 8 is a fundamental configuration block diagram of the distributed transaction processing system in the first embodiment. The comparison of FIG. 8 to FIG. 4 clarifies the following differences; that is, (1) there are provided inside a transaction manager TM30, a global deadlock detector GDD32 for detecting deadlocks between global transactions and a WFG management table 33 for managing wait-for relation between global transactions in the form of wait-for graph; (2) inside respective resource managers 31a–31c, there is provided only a local transaction manager LTM34a for managing transactions to be processed by respective resource managers and a local lock manager LLM35a for controlling locking and unlocking resources by receiving hardware resources acquisition or release requests.

In the configuration shown in FIG. 8, the transaction manager 30 is provided with GDD32 for detecting deadlocks between global transactions. By interfacing between GDD32 and a local lock manager LLM inside each resource manager by LLM notifying GDD32 of an identifier of a waiting transaction and an identifier of a make-wait global transaction, wait-for relation between global transactions are collectively registered with a WFG management table 33. In this connection, the waiting transaction signifies the global transaction as to which despite of an attempt to occupy a certain resource, the resource has been already occupied by another global transaction and thus is made to be put in a wait-state, whereas the make-wait global transaction signifies the global transaction as to which by occupying a resource by itself, another global transaction is made to be put in a wait state. By doing so, deadlocks generated so as to stretch over a plurality of global transactions can be detected. Here, interfacing between the GDD and the LLM indicates that a global transaction identifier of a waiting global transaction and a global transaction identifier of a make-wait global transaction are transferred.

Next, an operation of each block shown in FIG. 8 will further be detailed. First, a transaction manager 30 receives a start, termination(commit), and cancellation(roll-back) of a transaction from an application program. The TM30 allocates an identifier to a global transaction uniquely so as to manage global transactions, and then directs a local transaction manager LTM inside resource managers 31*a*–31*c* which manage transaction branches which is a part of the global transaction, to start, terminate, and cancel the transaction branches.

The resource managers 31*a*–31*c* manage transactions to be processed within respective resource managers to assure data consistency in accessing database or files. Here, the data consistency is referred to represents, for example, whether or not data type is matched to before and after the commit.

According to this first embodiment, the local transaction manager LTM receives an instructions of start, termination, and cancellation of transaction branches from the transaction manager and associates global transaction identifiers with transaction branch identifiers to manage transaction branches. In response to instructions to terminate and cancel a transaction from the transaction manager, the local transaction manager LTM notifies the local lock manager LLM of an identifier of a transaction to be terminated or canceled.

The local lock manager LLM receives a request to acquire or release hardware resources to lock or unlock resources from an application program. For a resource lock request, if the resource can be occupied by the application program, processing after the processing of the local lock manager returns to the transaction manager. If the resource cannot be locked, occupation of the resource, i.e., the identifier of transaction waiting for locking, and the identifier of transaction currently occupying the resource are notified to the global deadlock detector GDD32, followed by the contents being registered with the WFG management table 33. When receiving the resource release request, the LLM notifies the GDD32 of the identifier of a transaction to be unlocked of the GDD32, followed by eliminating the registration of the transaction from the WFG management table 33.

The global deadlock detector 32 receives a registration request or a deletion request of contents of the WFG graph from the local lock manager inside the respective resource managers. When receiving the request to register contents of the WFG, the global deadlock detector 32 registers the contents, and then it is determined whether or not there are deadlocks between global transactions.

As a result of the determination, if a deadlock has not been generated, the wait state starts between global transactions. When a deadlock has been generated, a global transaction to be canceled in response to the deadlock is selected and a deadlock is set to the transaction to be canceled. Then, after canceling the deadlock state in a wait-for graph, processing returns back to the local lock manager.

When receiving a deletion request for deleting contents of a WFG the identifier of the transaction is deleted and a global transaction connected next to the transaction canceled is set to retry, followed by the processing returning to the local lock manager.

Subsequently, an example to detect a deadlock generated so as to stretch over resource managers between global transactions will be explained with reference to FIG. 9 by comparing with the conventional example shown in FIG. 5. Comparing FIG. 9 with FIG. 5 results in finding that the following points are different between both of the FIGS., i.e., (1) the transaction manager 30 is provided with a global deadlock detector 32 and a WFG management table 33 for managing wait-for relation between global transactions; and (2) respective resource managers 31*a* and 31*b* are not provided with a WFG management table.

Figure 5:
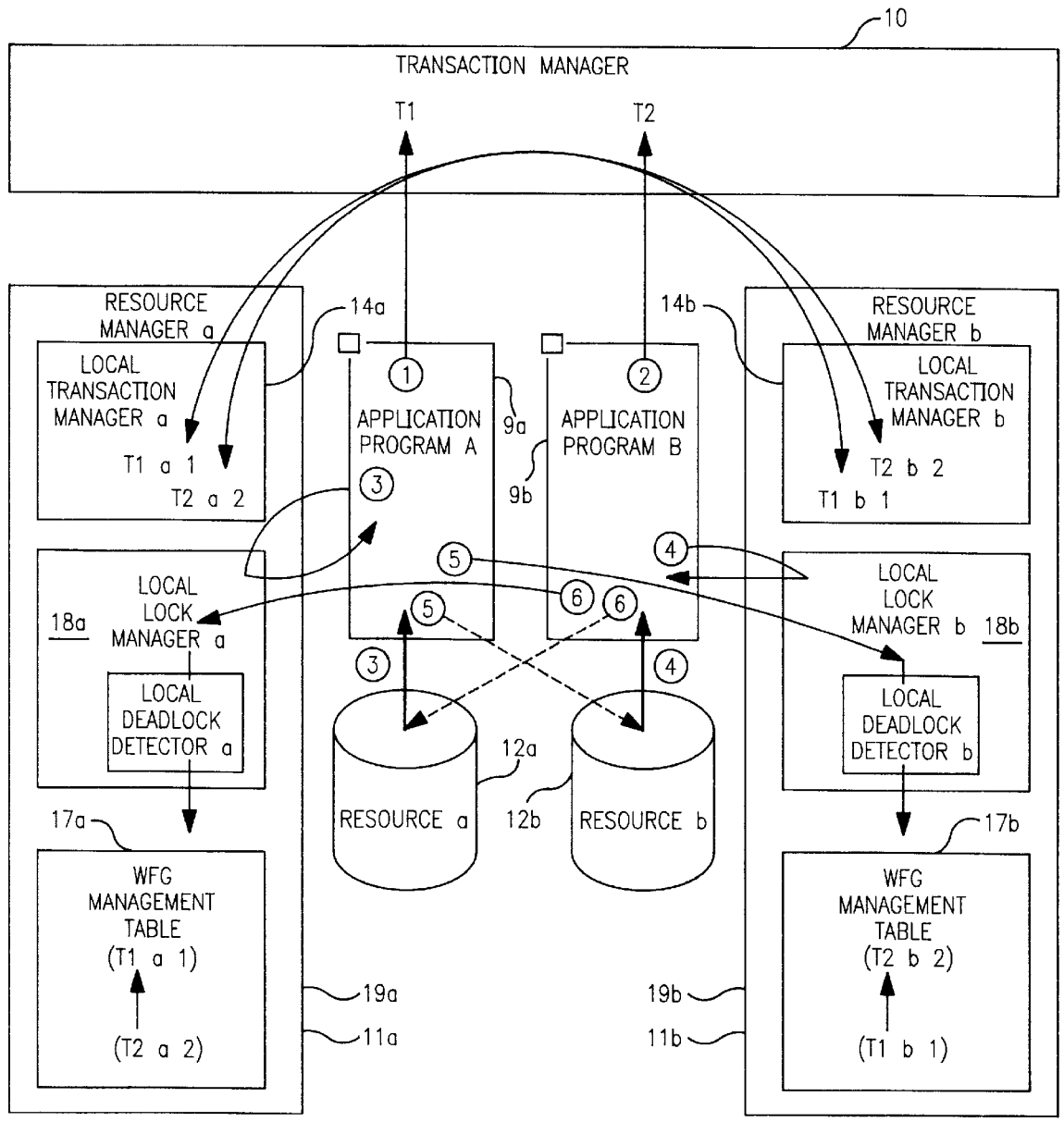
FIG. 5 illustrates processing in which a deadlock is undetectable between global transactions in a convention prior art technology.
Figure 9:
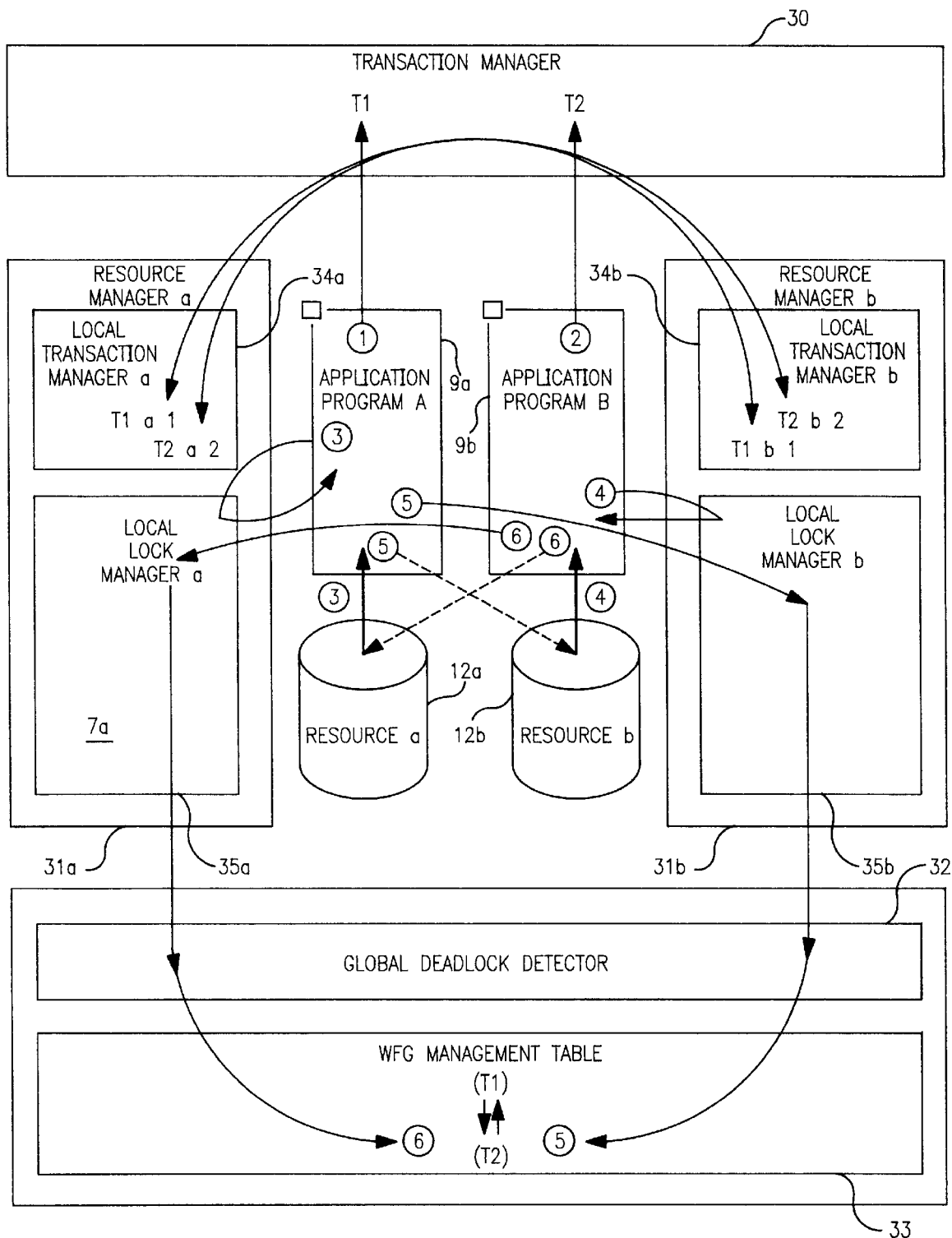
FIG. 9 illustrates deadlock detection between global transactions in the first embodiment.

Operations in processing shown by the lines marked ①–④ in FIG. 9 are identical to those in FIG. 5, the description thereof being omitted. Then, the application program A9*a* issues an access request for accessing the resource 12*b* to the resource manager 31*b*. In response to this request, the local lock manager 35*b* provided inside the resource manager 31*b* make a determination as to whether or not the resource 12*b* is locked to detect that a transaction branch T1*b*1 waits for T2*b*2, followed by requesting the global dead lock detector 32 to register the wait-for relation that global transaction T1 waits for T2. The GDD32 determines whether or not there is a deadlock after registering the wait-for relation with the WFG management table 33, followed by determining that a deadlock has not been generated.

At almost the same time as the operation shown by the line marked ⑤, in processing shown by the dotted line marked ⑥, the application program B9*b* issues a request to access the resource 12*a*. In response to this request, the resource manager 31*a* makes lock determination for the resource 12*a*, thereby detecting that transaction branch T2*a*2 waits for T1*a*1 and in addition, subsequently issuing a request to register the wait-for relation that global transaction T2 waits for T1. The GDD32, after registering T2→T1 which is the wait-for relation, makes a deadlock determination. Now here, the contents of the WFG management table 33 can be represented schematically as below.

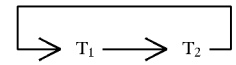

This shows that a loop is formed between global transactions T1 and T2, thereby enabling a deadlock to be detected.

Figure 10A:
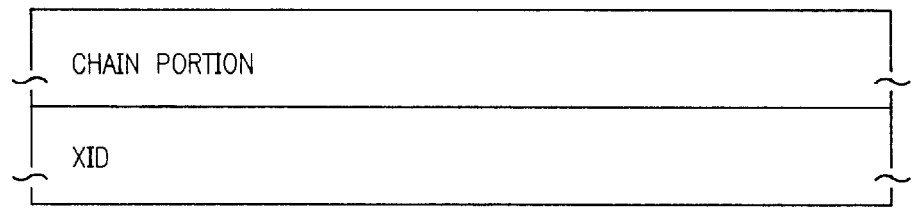
FIGS. 10A–10E illustrate the contents of a wait-for graph.

FIGS. 10A–10E illustrates the WFG management table. FIG. 10A shows contents of node constituting a WFG and the contents comprise a chain portion and a XID portion as an identifier. The chain portion is divided into a tree-like structured chain for managing wait-for relation and a hash portion for retrieving nodes from XID values.

Figure 10B:
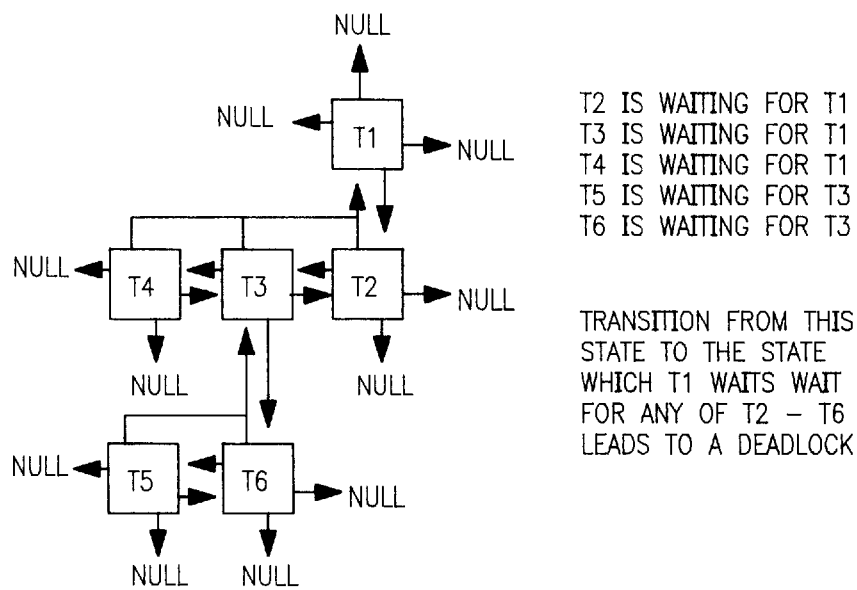

FIG. 10B conceptually illustrates a tree structure of the chain portion. In the figure, wait-for relation between nodes are shown by arranging them in an upper location or a lower location, where it is shown that global transaction T2, T3, and T4 wait for T1, respectively, and T5 and T6 wait for T3. In this state, if the global transaction T1 transits to wait for any of T2–T6, then the relation between global transactions becomes a deadlock.

Figure 10C:
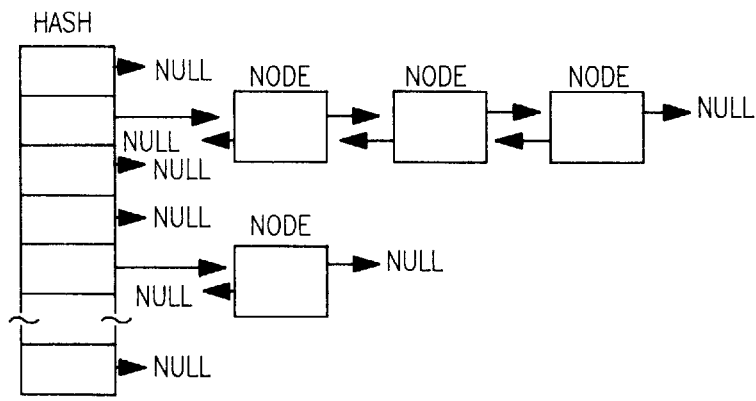
Figure 10D:
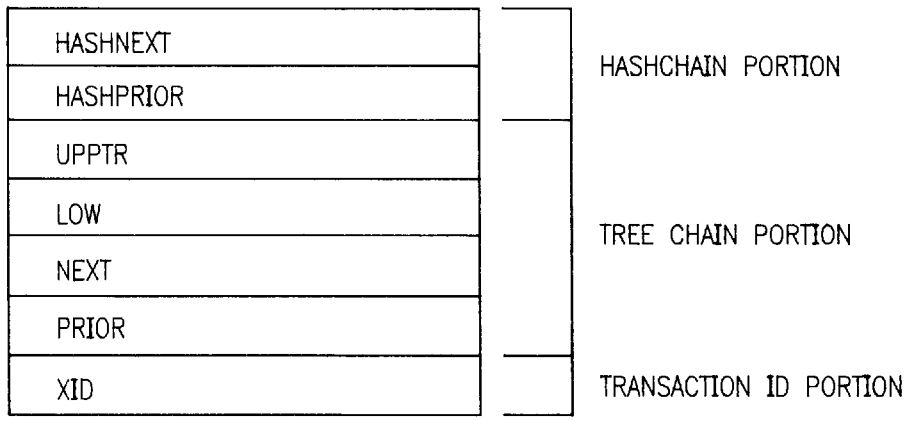

FIG. 10D shows an example of constitution of contents of the wait-for graph shown in FIG. 10A. As described before, contents of data indicating nodes in graph comprises a chain portion and a transaction ID portion. The transaction ID portion(XID portion) has the information set therein with respect to a XID defined by the X/Open. The chain portion, as described above, comprises a hash portion and a tree portion. The chain portion is further divided into hashnext, hashprior, upptr, low, next, and prior, and absolute or relative addresses in the shared memory are set thereto, and wait-for relation between nodes represented schematically in FIG. 10B or FIG. 10C is set, where upptr shows the address of nodes drawn on the above in FIG. 10B, low represents addresses of the node located below, and next and prior represents addresses of nodes positioned right and left, respectively. The hash portion will be described later.

Figure 10E:
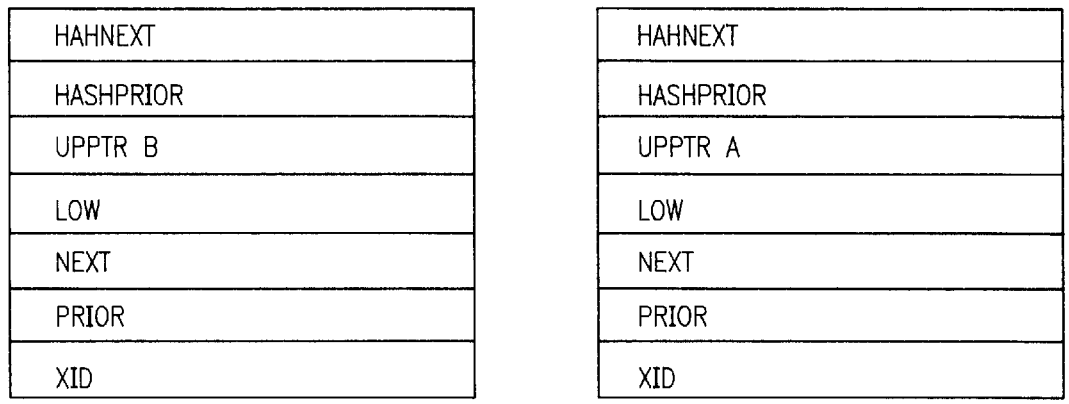

FIG. 10E shows contents of data of each node when relation similar to the deadlock between the transactions T1 and T2 described above, is generated between the nodes A and B.

In the node A, in the column upptr, B (an address corresponding to the node B) is stored, and in the node B, in the column upptr, A (an address corresponding to the node A) is stored. For example, in the node A, the setting of the address of the node B on the column upptr indicates that wait-state is generated. Likewise, in the node B, the setting of the information of the node A on the column upptr indicates that the node B is put in a wait-state. Accordingly, the relation stands up lying in that the node A is made to wait for by the node B, and the node B is made to wait for by the node A between these two nodes, and thus it is detected that a deadlock has been generated. In this connection, when the deadlock is generated as described above, the relation to be written on the column upptr is as shown. The other chain portions(a hash portion and a tree portion) contain various values depending upon the order in which a XID and wait-for relation occurs.

FIG. 10C shows a relation between hash and node. By this relation, nodes can be retrieved from a XID.

The hash portion corresponds to an index-like in the case where, when a XID of a certain transaction is given, the address of a node corresponding to this transaction is obtained. Each box shown left in FIG. 10C has the same value of hash and one or more nodes are associated with one value of hash. Each node is classified and managed using a hash value. Hashnext and hashprior indicate a connection relation between nodes classified so as to have the same hash value, and hashnext shown in FIG. 10D and 10E indicates the address of the node next to the self node. The hashprior indicates the address of a node connected immediately before the self node.

Figure 11:
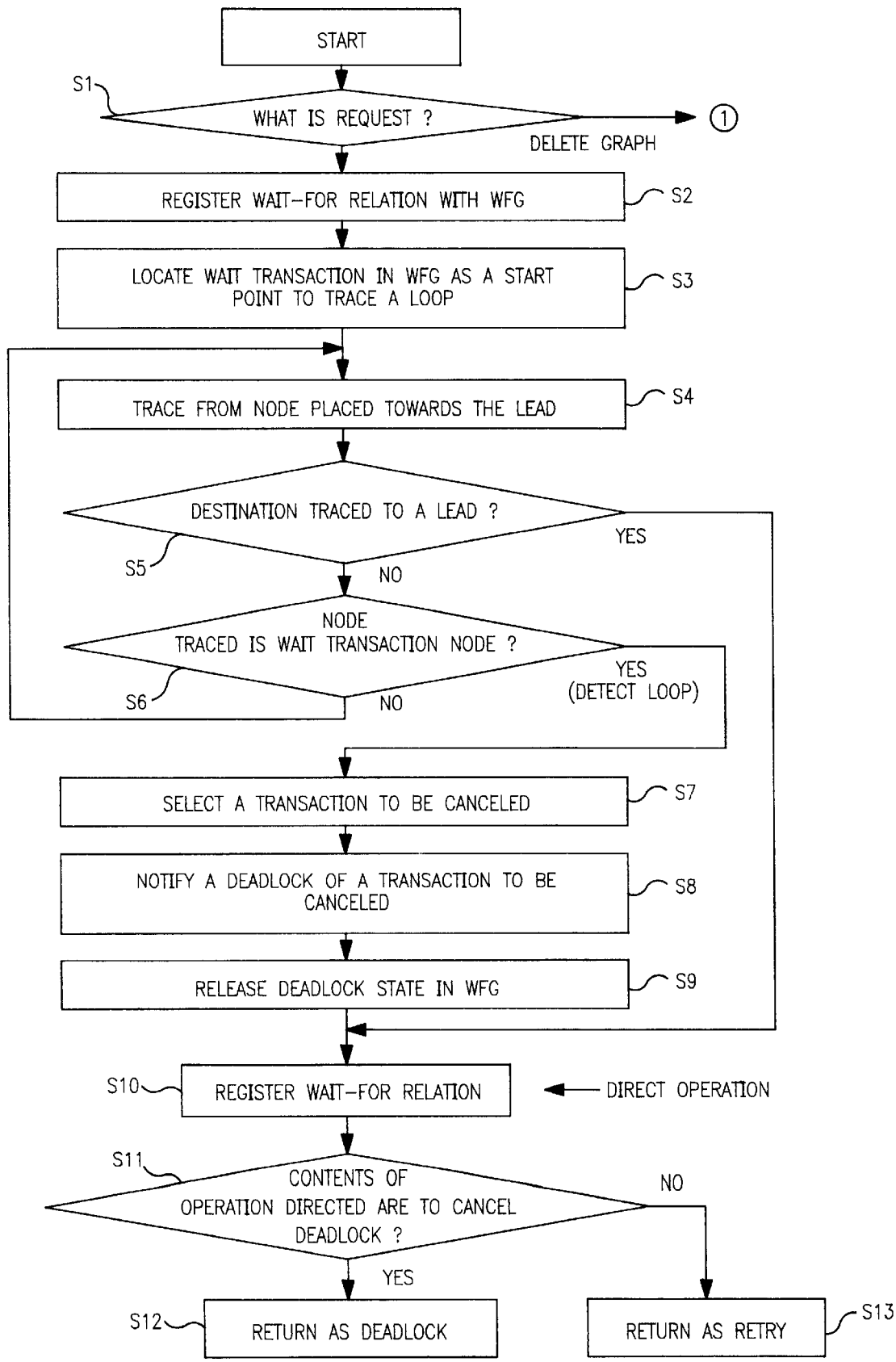

FIGS. 11 and 12 are flowcharts of the processing by the global deadlock detector(GDD) provided inside a transaction manager in the first embodiment. The processing by the global deadlock detector will be explained hereinafter with reference to the figures. When the processing starts, first in step S1, it is determined what request was issued to the GDD. When it is a request for registration with a wait-for graph, in step S2 wait-for relation of the global transaction is registered with the WFG. And in step S3 a transaction whose wait-for relation has been newly registered(a waiting transaction) is set as a starting point to trace the loop for deadlock determination.

Further, in step S4, the preceding node is traced towards the lead of a wait-for graph from the node set as a starting point. That is, a global transaction is detected which is being waited by the transaction whose wait-for relation was newly registered. And, it is determined whether or not the destination node traced to in step S5 is the lead of the wait-for graph. If not the lead, in step S6 it is determined whether or not the node traced to in step S5 is the waiting transaction in step S3, that is, the node whose wait-for relation was newly registered. In other words, it is determined whether or not the node whose wait-for relation was newly registered coincides with the node traced to in step S5. The coincidence of both the nodes results in the fact that a loop was detected.

If the determination in step S6 is in the negative(NO), processing is repeated from step S4. While, if the node traced to in step S6 coincides with the node whose wait-for relation was newly registered, that is, a loop is detected, a transaction to be canceled is selected in step S7, and it is notified to the transaction that the transaction is in the deadlock state. And, the deadlock state in the WFG is released in step S9, and then in step S10 new wait-for relation is registered after the release, followed by being put in the wait-state. On the other hand, determination of the node traced to in step S5 being the lead node signifies that, before detecting a loop the wait-for graph is traced to the lead of a WFG. Since this signifies that a deadlock state has not been generated, the processing proceeds to the wait-state in step S10.

The wait-state in step S10 is canceled at the time when, for example, an operation is directed by the transaction waiting to occupy a hardware resource. In step S11 it is determined whether or not the content of the operation direction is to cancel a deadlock, and if the answer is in the affirmative(YES), processing is returned to a resource manager in step S12. Whereas, if not cancellation due to a deadlock, that is, if the waiting transaction attempts retry to occupy a hardware resource in step S13 the retry processing returns to the resource manager.

On the other hand, when a request in step S1 is to delete the graph, the transaction corresponding to the node waiting for the node to which a deletion request was issued in step S14 shown in FIG. 12 is directed to operate, and the wait-for relation in the WFG is deleted in step S15, followed by the processing returning to the resource manager in step S16.

FIGS. 13A and 13B show the contents of a priority portion provided inside a global transaction identifier. According to the present invention, when a deadlock is generated between global transactions, a global transaction to be canceled is selected in response to the contents of this global transaction identifier. FIG. 13A illustrates a transaction classification portion and a transaction counter portion of a priority portion provided inside a global transaction identifier.

According to the present invention, the first standard and the second standard are provided as a criterion for selection at the time of canceling a global transaction. The fist standard depends upon the predetermined classification of a transaction, and can be set at any time by a user, for example, regardless of a type of an application program or a transaction. And, a transaction counter is used as the second standard. The counter is a unique counter within global transactions and is allocated in the order in which global transactions have been generated in the ascending direction (upwards).

When a deadlock is generated between global transactions, first by applying the first standard, a global transaction having lower priority is selected to be canceled. This classification as the first standard indicates the priority given by a user as described above, and is set as the contents of an transaction identifier at the time of starting a global transaction.

On the other hand, when there are a plurality of transactions having same classification, a transaction to be canceled is selected using the second standard. As the value of the second counter becomes smaller, the longer time elapses after the transaction occurs, and thus it can also be considered that the work-load of the transaction is larger. Accordingly, the smaller the counter value, is the higher the priority of a transaction is made to be.

FIG. 13B shows an example of contents stored in the priority portion. If a deadlock is generated between these four transactions T1–T4, first, using the first standard (a larger numerical value is specified to be higher in priority.), either of T1 or T4 is to be canceled, and the transaction T4, having a larger counter value, is selected to be canceled according to the second standard.

Figure 14:
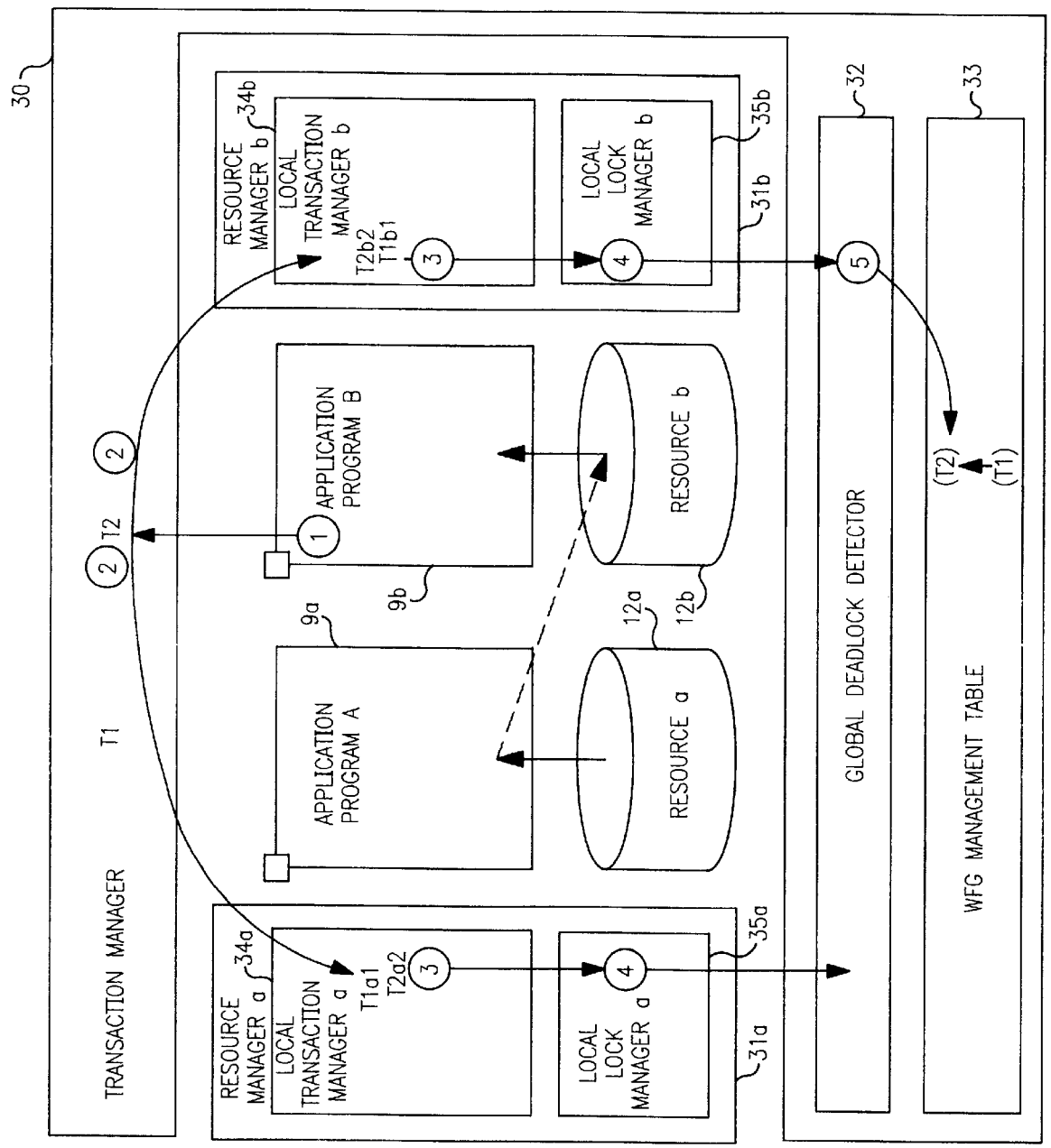
FIG. 14 illustrates system operation at the end of a transaction the first embodiment.

FIG. 14 illustrates an operation at the time of terminating a transaction in the first embodiment. In this figure, now the processing shown by the line marked ⑤ explained with reference to FIG. 9 was executed, and it has been registered with the WFG management table 33 that a global transaction T1 waits for a global transaction T2. That is, a resource 12a is occupied by a transaction T1 required by an application program A9a, and the transaction T1 is waiting for T2 so that an application program A9a locks the resource 12b. In addition, the global transaction T2 required by the application program B9b is occupying a resource 12b. In this state, the operation in the case where an application program B9b issued to the transaction manager 30 the termination of an transaction(transaction end)will be explained next.

In FIG. 14, first an application program B9b issues a request for terminating a transaction to the transaction manager 30 as shown by the line marked ①. In response thereto, the TM30 issues a transaction termination request to two resource managers 31a and 31b to terminate transaction branches being executed as a part of the global transaction T2 in processing shown by the line marked ②.

Local transaction managers(LTM)34a and 34b that receive this transaction branch termination request issue an occupation release request for releasing the occupation of hardware resources by the transaction T2 to the local lock managers(LLM)35a and 35b in processing shown by the line marked ③. Each of the LLM35a and the LLM35b both of which receive this request issue a delete request for deleting a global transaction T2 from the WFG to a global deadlock detector 32 in processing shown by the line marked ④.

The GDD32 that receives this deletion request checks the contents of the wait-for graph(WFG) in processing shown by the line marked ⑤ to issue a retry request to the transaction T1 following T2, i.e., waiting for T2. By doing this, a retry operation to acquire the resource 12b from the global transaction T1 is executed. Followed thereby, the contents of wait-for registration related to the global transaction T1 requested by the resource manager 31b to the GDD32 are canceled, thus resulting in that the resource 12b is occupied by the global transaction T1 generated by the application program A9a. Incidentally, in the processing shown by the line marked ④, a delete request for deleting the global transaction T2 to the GDD32 is issued by the two resource managers 31a and 31b. The first request from thereamong, is adopted and no processing is performed for a request having the same contents by the GDD32.

As described above, in terminating the transaction, generally the resources locked by a transaction are collectively unlocked. However, some of resources can be unlocked before the transaction end depending on a resource manager as dynamical unlock of resources. However, in an attempt to explain this case with reference to FIG. 14, the delete request for deleting a global transaction issued by the WFG in the processing shown by the line marked ④ is issued by one resource manager only.

Figure 15:
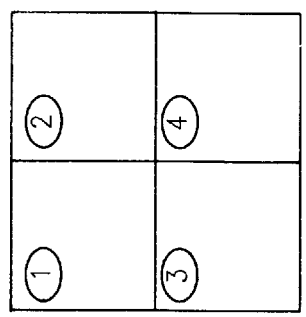
FIG. 15 illustrates change of scope in locking resources by a resource manager.

FIG. 15 conceptually illustrates a change of range of resources to be locked by the resource manager. This change in the range of resources to be locked is enabled only when the resource manager provides for an application program, a function of changing, i.e., expanding or reducing the range of resources to be locked.

This will be explained next with reference to FIG. 15. The expansion of the range of resources to be locked signifies that, for example, a transaction which has locked the portion ① successively locks the portions ②–④ while retaining the locking of the portion ①. Meanwhile, the reduction of the range of resources to be locked signifies that a transaction which has locked the portions ①–④ unlocks the portions other than the portion ①.

As described above, in processing in a case where the range of resources to be locked is changed, the local lock manager(LLM) shown in FIG. 9 issues an occupation unlock request to the global deadlock detector(GDD) in the case of reduction. However, on the contrary, no processing is performed in the case of expansion. That is, in the case of expansion, change of the range of resources to be locked for the transaction whose range of resources to be locked has been expanded is not needed, thus requiring no processing. By contrast, among transactions waiting for a transaction whose range of resources to be locked has been reduced, it is natural that a transaction can exist which is requiring locks of resources for the ranges from ② to ④. For this reason, the LLM is needed to issue an occupation unlock request to the GDD.

Next, when a resource manager is providing a function of changing locking strength for an application program, the locking strength by which the transaction has locked can be changed. Hereupon, the locking strength represents competitive/exclusive patterns with other transactions, and typically can be shown in the following table.

| | | FOLLOWING TRANSACTION | |
|---|---|---|---|
| | | REFERENCE | UPDATING |
| PRECEDING | REFERENCE | COMPETITIVE | EXCLUSIVE |
| TRANSACTION | UPDATING | EXCLUSIVE | EXCLUSIVE |

Hereupon, the preceding transaction represents a transaction which has earlier occupied a resource, while the following transaction represents a transaction which accesses later the same resource the preceding transaction has occupied. And, as described in this table, the locking strength is classified as a locking strength in the case where reference is made, and that in the case where updating is made. Generally between transactions in which reference is made to each other, locking of a resource can be shared and a wait-state between transactions (written as "competitive" in the table) does not occur, whereas a wait-state occurs between transactions written as "exclusive" in the table.

When the locking strength was changed as described above, the local lock manager(LLM) must perform the following operation for the global deadlock manager(GDD). That is, when the locking strength is changed as aforementioned, the local lock manager (LLM) needs to issue an occupation release request to the GDD(Global Deadlock Detector) when a transaction with which resources can be shared is newly generated, whereas when a transaction is not generated with which a resource can be shared, no operation is performed even when locking strength is changed.

Next, the second embodiment according to the present invention will be explained. In the first embodiment described above, all transactions to be processed within the system are global transactions, and a plurality of resource managers executes processing for transaction branches as a part of a global transaction. Whereas, in the second embodiment, each of the resource managers executes processing for local transactions which the resource manager performs by itself, in addition to transaction branches of the global transaction.

Figure 16:
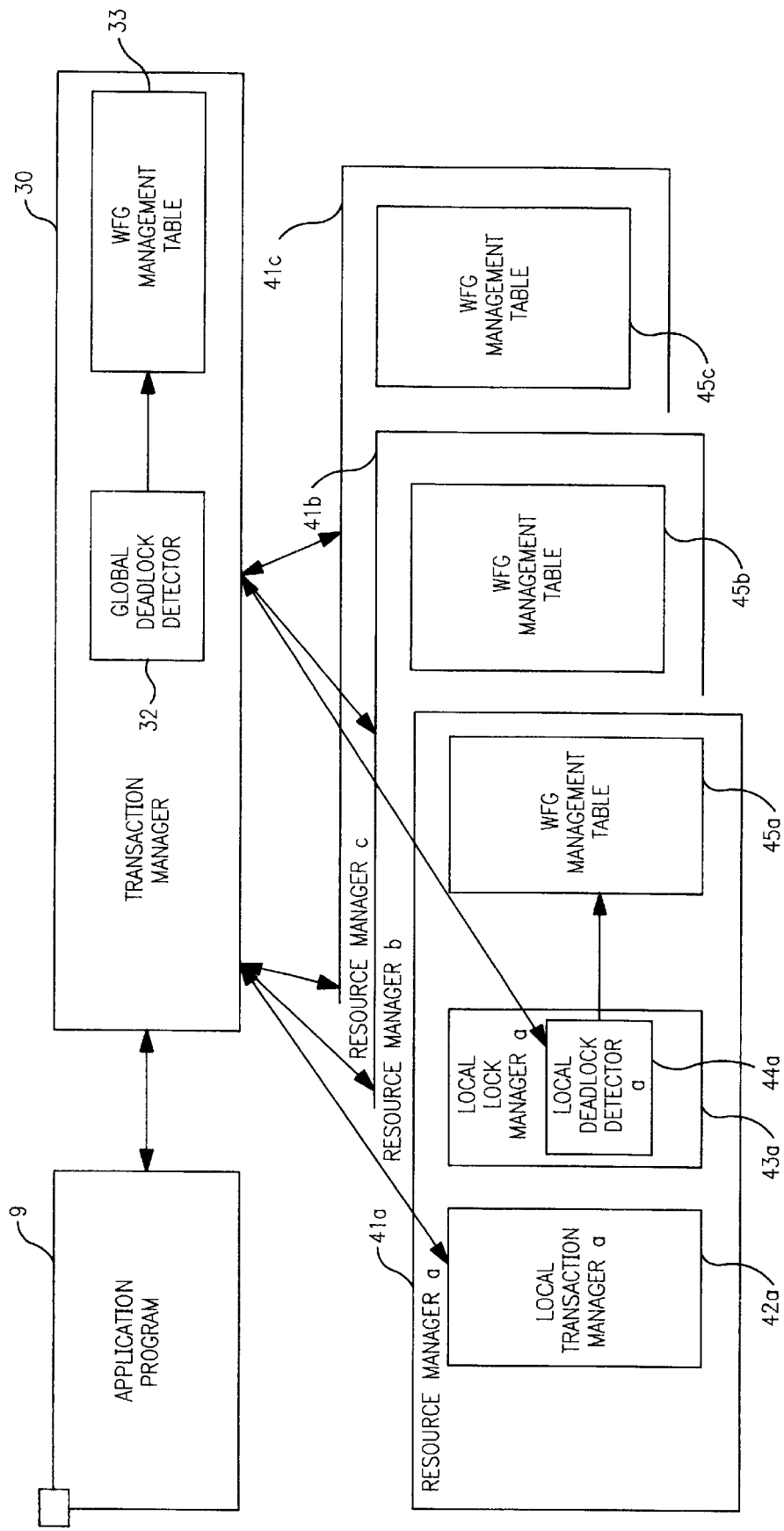
FIG. 16 is a block diagram showing a fundamental configuration of a distributed transaction system in the second embodiment.

FIG. 16 is a block diagram of a fundamental configuration of a distributed transaction processing system as the second embodiment. Comparing FIG. 16 with FIG. 8 clarifies that the following points are different from the block diagram of the fundamental configuration according to the first embodiment. That is, each of the local lock manager provided within resource managers 41a–41c, for example, a LLMa43a is provided with a local deadlock detector(LDDa) 44a for detecting a deadlock within the resource manager, and the WFG management table 45a for managing wait-for relation between transactions is provided within the resource manager 41a.

Operations of each block shown in FIG. 16 are almost identical to those of FIG. 8, and thus the different portions only are explained. First, the local transaction manager (LTM) manages transaction branches as a part of a global transaction. Further, the local transaction manager, when receiving commands from the application program 9 such as a start command, a terminate command, a cancel command for a transaction which the resource manager processes by itself, i.e., a local transaction, manages the transaction.

The local lock manager LLM, in the same manner as shown in FIG. 8, when receiving resource acquisition or release requests, locks or unlocks resources. However, when a resource cannot be locked, the identifier of the transaction constituting a wait-for relation is notified to the GDD as well as the LDD. When receiving a resource release request, in the same manner an identifier of a transaction which unlocks a resource is notified to the LDD.

The local deadlock detector(LDD) is directed to register and delete a wait-for graph(WFG) by the local lock manager (LLM). When receiving a registration, after registering a new node with the wait-for graph, deadlock determination is made. When the determination indicates that no deadlock has been generated, it is determined whether or not transactions newly constituting a wait-for relation are local transactions. If either of transactions to make another transaction wait or to wait for another transaction or both of the transactions are local transactions, the transaction is put in the wait-state. When both of the transactions are transaction branches under the control of the global transaction, identifiers of both the transactions are notified to the GDD under the control of the transaction managers.

When the deadlock determination results in detecting a deadlock generated, a transaction is selected to cancel the deadlock, and after canceling the deadlock-state in the WFG it is determined whether a transaction selected is a global transaction or a local transaction. If the transaction is a transaction branch under the control of a global transaction, the GDD detects the deadlock and subsequently performs adequate processing, but no processing is performed on the LDD side. If the transaction to be canceled is a local transaction, the dead lock cancellation is notified to the local lock manager(LLM).

When the processing is returned to the LDD from the wait-state in the GDD, if the returning is due to retry, retry is notified to the LLM, while when due to a deadlock, the deadlock is notified to the LDD.

With respect to a global deadlock detector GDD, its operations are substantially identical to those shown in FIG. 8. However, the GDD is interfaced with the local lock manager(LLM) in FIG. 8, whereas the LDD is directly interfaced with the GDD in FIG. 16, in this respect of which the operation differs between FIG. 8 and FIG. 16.

Figure 1:
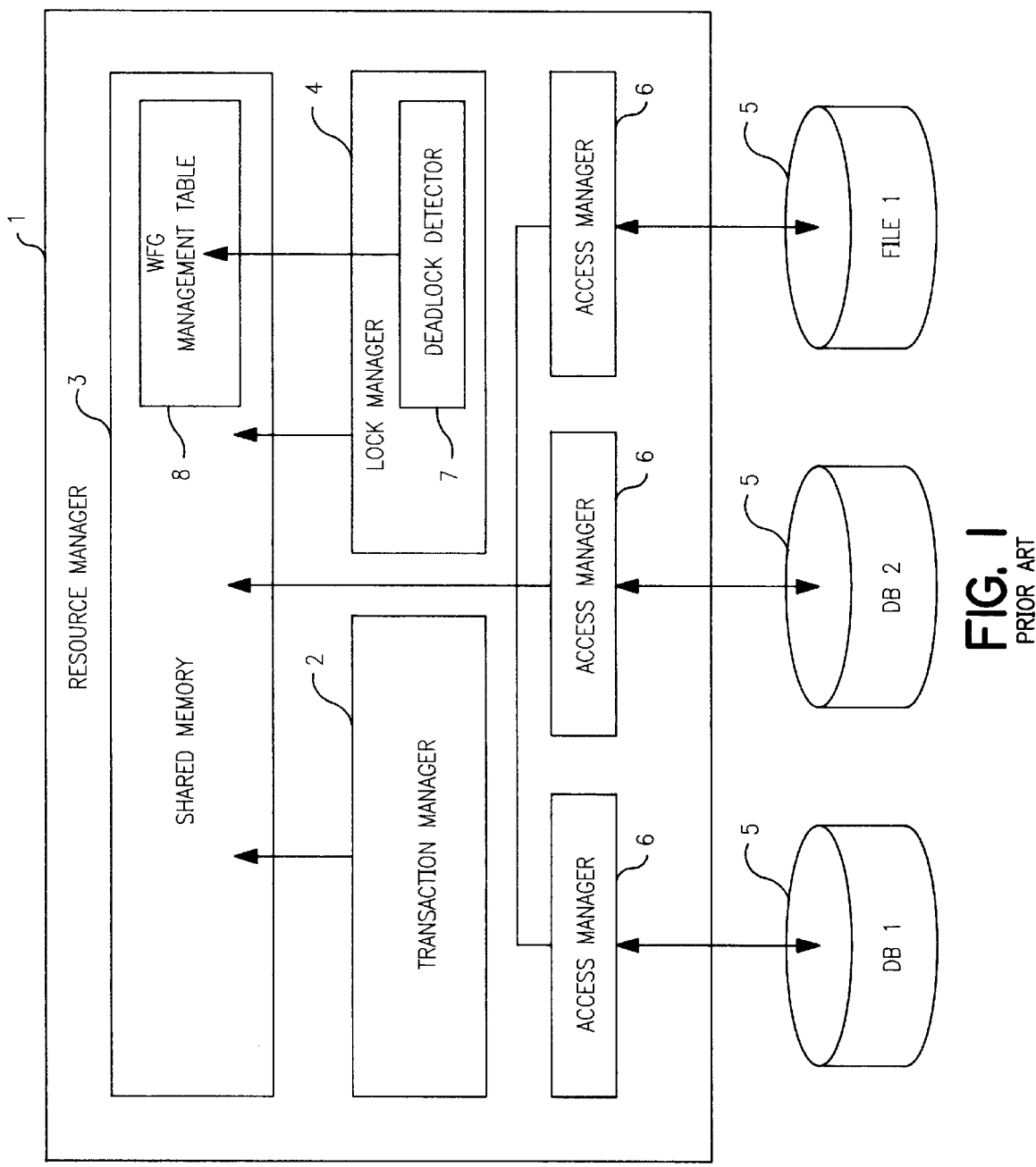
FIG. 1 illustrates a deadlock detection in a closed system.
Figure 2:
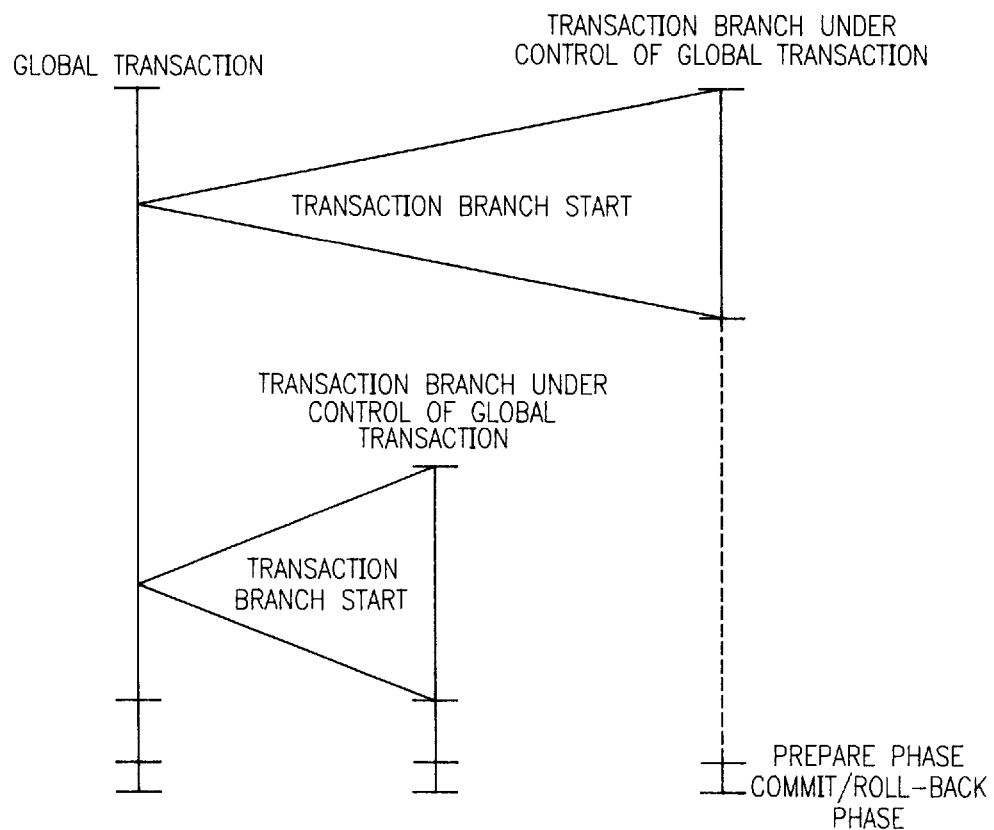
FIG. 2 illustrates concepts of a global transaction and a transaction branch.
Figure 3:
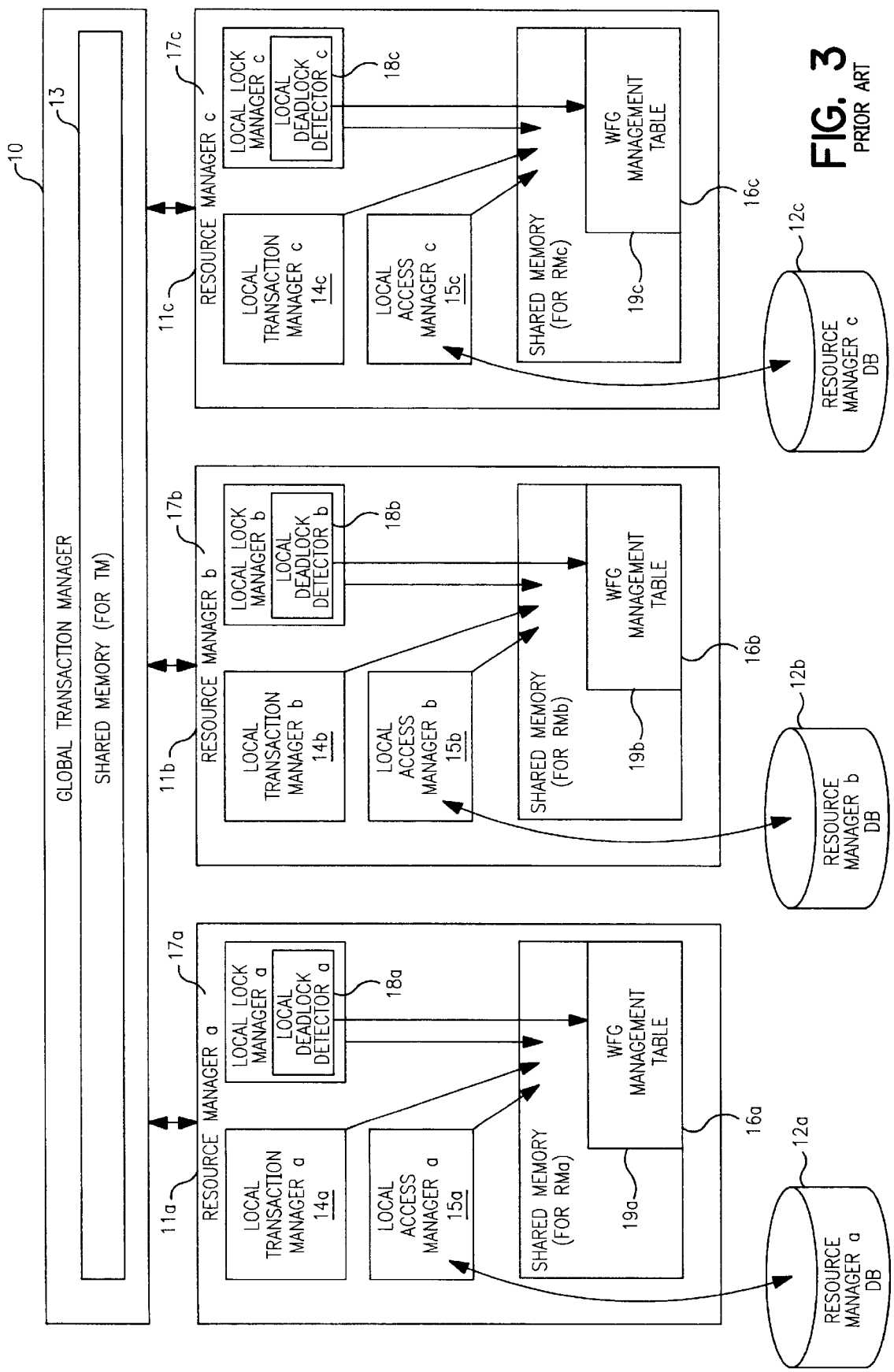
FIG. 3 illustrates conventional deadlock detection in a open system.
Figure 17:
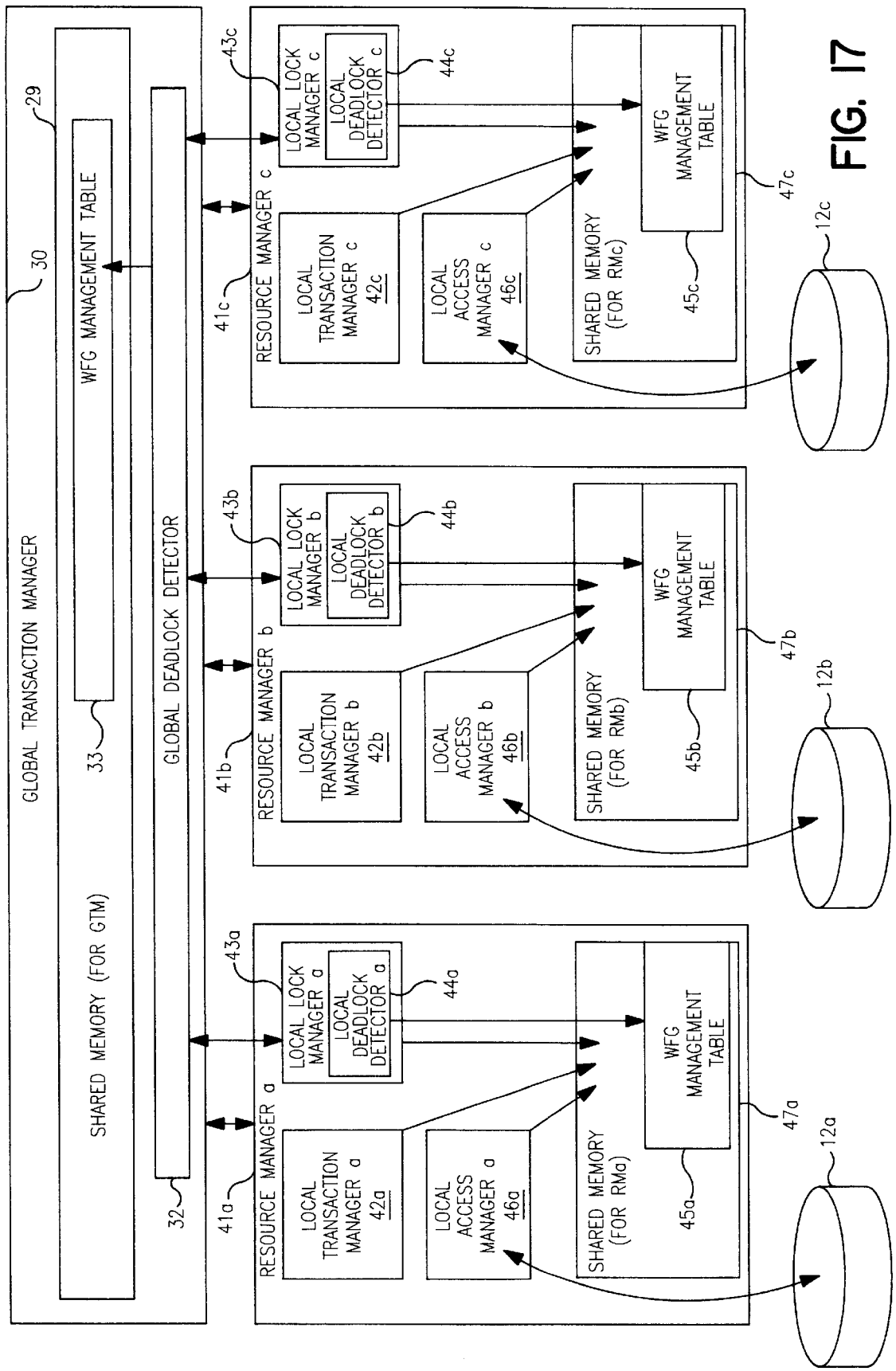
FIG. 17 is a block diagram showing a detailed configuration of a distributed transaction processing system in the second embodiment.

FIG. 17 is a block diagram of a detailed configuration of a distributed transaction processing system as the second embodiment of the present invention. Comparing FIG. 17 with FIG. 3 results in finding differences in that, in FIG. 17 a global deadlock detector 32 for detecting deadlocks between global transactions are provided within a global transaction manager 30 and a WFG management table 33 with which wait-for relation is registered are provided within a shared memory 29, respectively.

FIGS. 18A and 18B illustrate a wait-for relation between a global transaction and a local transaction in a system shown in FIGS. 16 or 17. FIG. 18A illustrates a method of managing wait-for relation, for example, Tixm represents a transaction branch under the control of a global transaction and xm represents a local transaction. With respect to wait-for relation between transaction branches, wait-for relation between transaction branches are managed by a global deadlock detector, while wait-for relation between a transaction branch under the control of a global transaction and a local transaction and that between local transactions are managed by a local deadlock detector.

FIG. 18B illustrates how to detect a deadlock. In this figure, a deadlock between transaction branches under the control of global transactions is detected by a global deadlock detector, and a deadlock formed between a transaction branch and a local transaction branch or between local transactions is detected by a local deadlock detector. However, even a deadlock generated between transaction branches can be detected by a local deadlock detector when generated within one resource manager. Furthermore, a deadlock generated between a transaction branch and a local transaction is detectable by the local deadlock detector when generated within one resource manager, whereas it is undetectable when generated so as to stretch over a plurality of resource managers.

Figure 19:
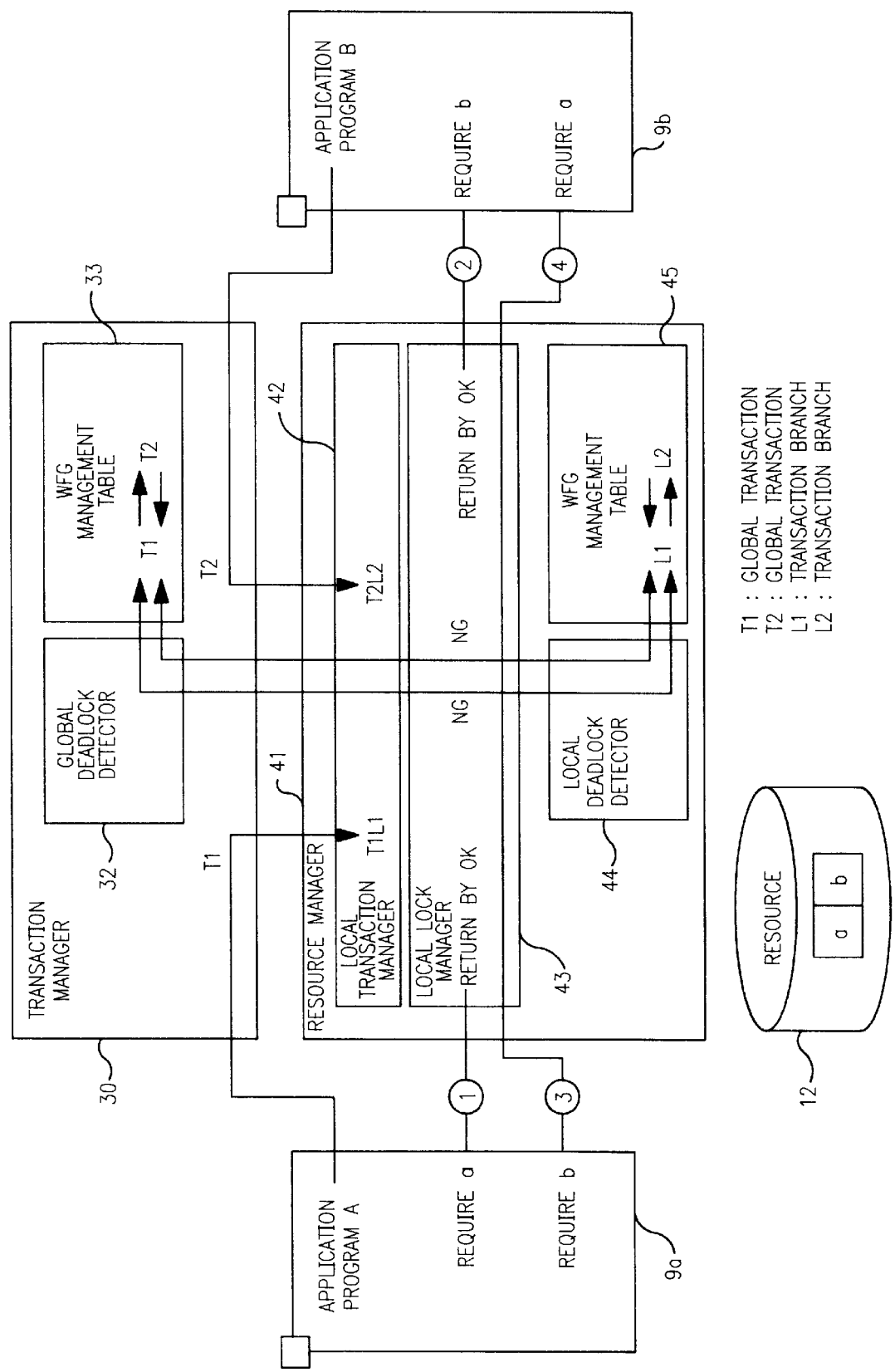
FIG. 19 illustrates deadlock detection between global transaction by a LDD(Local Deadlock Detector) in the second embodiment.

As described above, when a deadlock is generated between transaction branches under the control of a global transaction inside one resource manager, the deadlock generated is detected not only by the GDD, but also by the local deadlock detector. FIG. 19 illustrates an example of the case where such detection is performed. In this figure, it is assumed that transactions T1 and T2 required by two application programs 9a and 9b, are managed by a transaction manager 30, and transaction branches T1L1 and T2L2 are managed by the local transaction manager LTM42 within the resource manager RM41.

It is also assumed that an application program A9a has occupied a part a of a resource 12 through the processing shown by the line marked ① and an application program B9b has occupied a part b of the resource 12 through the processing shown by the line marked ②.

Thereafter, through a resource acquisition request for acquiring the resource b by the application program A9a in the processing shown by the line marked ③, wait-for relation that L1 waits for L2 is registered with the WFG management table 45 by the local deadlock detector LDD44 provided within the resource manager 41. At this time, since these two transactions are all transaction branches under the control of the global transaction, this wait-for relation is notified to the GDD32 and it is registered with the WFG management table that T1 waits for T2.

Thereafter, through the resource occupation request for occupying the resource a in the processing shown by the line marked ④, the LDD44 registers with the WFG management table 45 the fact that the transaction branch L2 waits for the transaction branch L1, resulting in detecting a deadlock by the LDD44. Additionally, since these transactions are transaction branches under the control of the global transactions, this wait-for relation is notified to the GDD32 and its contents are registered with the WFG management table 33, and the deadlock is detected also by the GDD32, thereby resulting in detecting a deadlock by both the LDD and the GDD.

In FIG. 19, when the local deadlock detector (LDD) detects a deadlock, first it is determined whether or not all of the transactions concerned with the deadlock are transaction branches under the control of a global transaction. In this determination, when determined that not all transactions are the transaction branches, local transactions are prioritized as transactions to be canceled. The reason is that, when a work-load is compared between a global transaction and a local transaction, generally a workload in a global transaction is greater. Even if the local transaction has worked more than the transaction branch within the resource manager, it is probable that the transaction branch has worked more in another resource manager prior to processing in the current resource manager.

When all of the transactions concerned with a deadlock are transaction branches under control of a global transaction, the LDD selects transaction branches to be canceled, for example, using the same protocol. The reason is that, since the deadlock is detected also by the GDD, transactions different from each other may be selected to be canceled by both of the LDD and the GDD. Subsequently, the LDD cancels the deadlock-state in the WFG. Finally, the LDD issues a request for wait-for registration to the GDD in response to wait-for relation between global transactions. This is because wait-for relation between global transactions is managed by the GDD.

Figure 20:
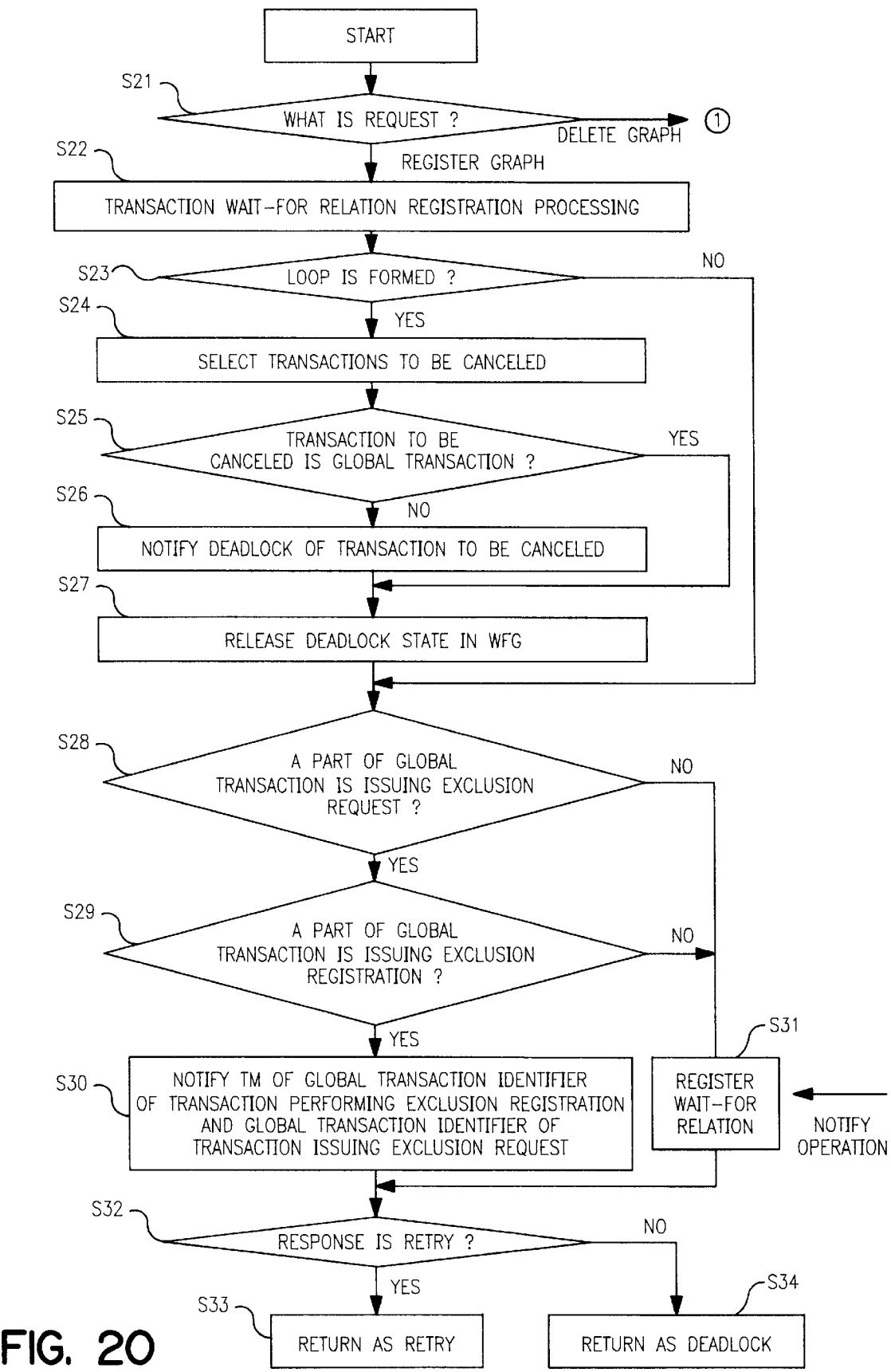
FIGS. 20 and 21 are flowcharts for processing by a local deadlock detector in the second embodiment.
Figure 21:
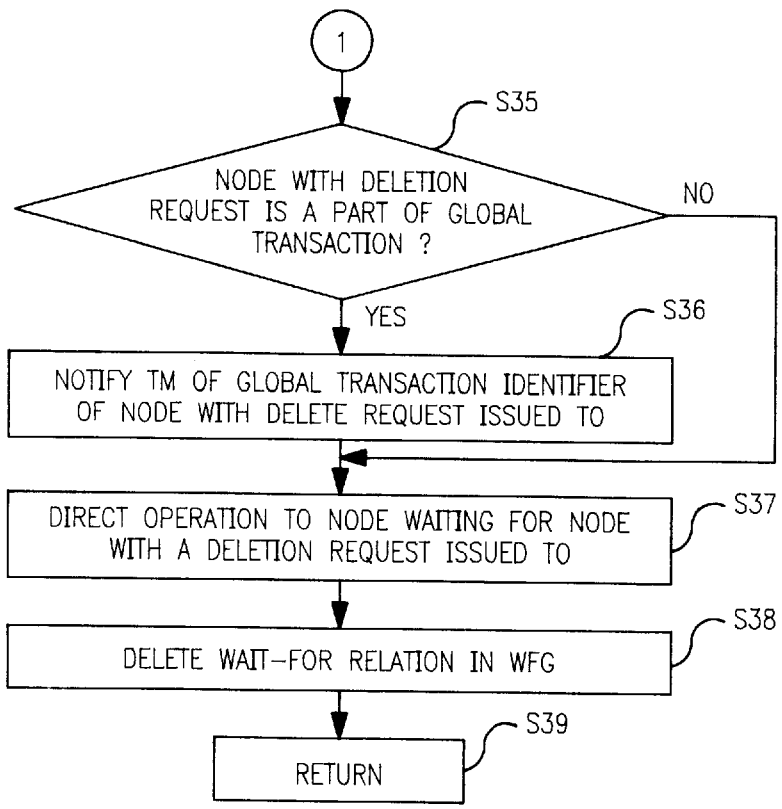

FIGS. 20 and 21 are both flowcharts of processing by a local deadlock detector(LDD) shown in FIGS. 16 and 17. In the FIG. 20, in step S21 it is determined whether or not a request for the LDD is for registration with or deletion of a graph. When determined to be the registration, in step S22 registration processing with respect to wait-for relation is performed, and in step S23 it is determined whether or not a loop has been formed using the WFG. Determining that a loop has been formed results in determining to be a local deadlock, and in step S24 a transaction to be canceled is selected. Then, in step S25 it is determined whether or not a transaction to be canceled is a transaction branch under the control of a global transaction. When determined not to be a transaction branch, in step S26 a deadlock is notified to the transaction to be canceled, whereas when determined to be a transaction branch, in step S27 a deadlock state in the WFG is released without performing processing in step S26, followed by processing proceeding to step S28. Incidentally, when determined in the step S23 that no loop has been formed, the processing proceeds to step S28 without performing processing in steps S24–S27.

In step S28, it is determined whether or not a resource occupation request, i.e. a resource exclusion request is issued by a transaction branch which is a part of a global transaction. When determined to be a transaction branch, in step S29 it is determined whether or not the transaction currently registered as being exclusive, i.e. occupying a resource is a transaction branch. When determined to be a transaction branch, in step S30 a transaction branch currently occupying a resource, and a global transaction identifier of the transaction branch issuing an exclusion request, i.e. an occupation request are notified to the transaction manager, and after returning processing from the transaction manager the processing proceeds to step S32. While, when determined not to be a transaction branch in steps S28 and S29, in step S31 the processing is put in a wait-state, and in the same manner as step S10 shown in FIG. 11, the wait-state terminates, for example, by being informed the fact that the transaction being waiting for occupation of a resource starts to operate and thereafter, processing proceeds to step S32.

In step S32, in the same manner as in step S11 shown in FIG. 11, it is determined whether or not contents of the response is retry. When determined to be retry, in step S33 the processing returns to the local lock manager(LLM) after retry is set as a return value of a function, whereas when determined not to be retry, in step S34 after a deadlock is set as a return value, and thereafter the processing returns to the LLM.

Thereafter, the following two operations are selectively performed;(1)the LLM notifies a resource occupation requester of deadlock, and then the cancellation of the transaction is scheduled by an application program of the resource occupation requester, thereby canceling the deadlock state, or (2)the LLM itself schedules to cancel the transaction to eliminate the deadlock state.

When the request to the LDD is to delete a graph in step S21, it is determined whether or not the node to which a deletion request is issued in step S35 shown in FIG. 21 is a transaction branch as a part of a global transaction. When determined to be a transaction branch, after the identifier of the global transaction received a deletion request is notified to the transaction manager in step S36, or when determined not to be a transaction branch, immediately after this determination, in step S37 the node waiting for the node to which a deletion request is issued within the WFG is directed to operate. And, wait-for relation in the WFG is deleted in accordance with the contents of the request in step S38, the processing returning back to the LLM in step S39.

Figure 22:
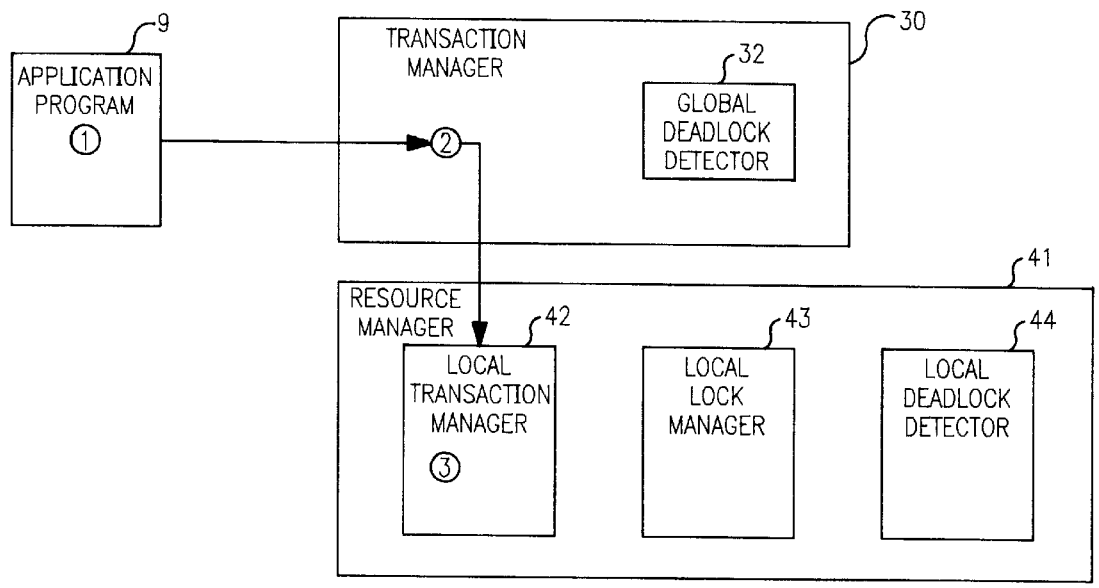
FIG. 22 illustrates a system operation at the time of starting a transaction in the second embodiment.

Next, the operation of a distributed transaction processing system in the second embodiment from the start to the end will be explained by associating it with commands within the system with reference to FIGS. 22–26. FIG. 22 illustrates operation of the system at the start of a transaction. In this figure, in processing ① an application program(AP9) issues a TX-begin as a command to the transaction manager 30, to begin a global transaction and in processing ② the transaction manager 30 acquires the global transaction identifier by receiving this command and issues a XA-start command to a resource manager 41. Responsive to this, the resource manager 41 generates a transaction branch in processing ③ for the management thereof.

Figure 23:
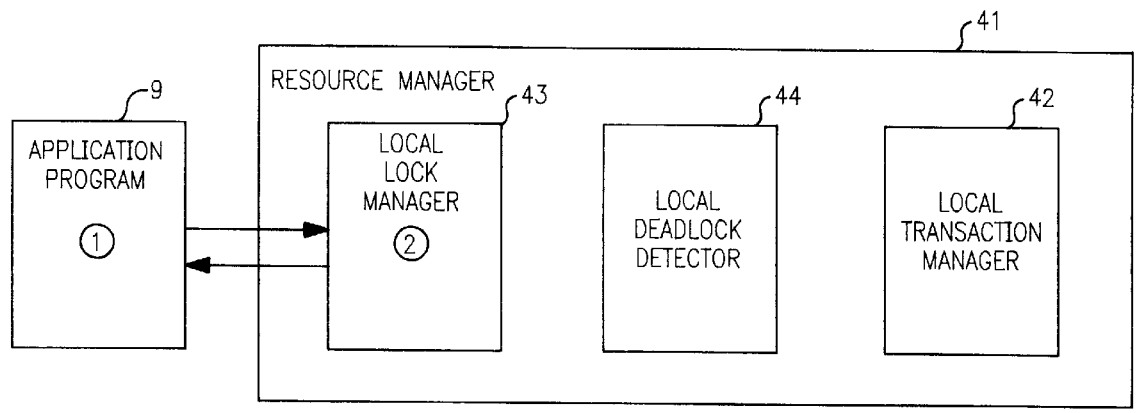
FIG. 23 illustrates a system operation for resource access request in the second embodiment of the present invention (a case where occupation is accepted)

FIG. 23 illustrates an operation to be performed in response to a resource access request by an application program, and the operation concerns a case where resources are accepted to be occupied. First, in the processing ①, an application program 9 issues a resource access request to a resource manager 41 in processing ①, and a local lock manager 43 within the resource manager receives this request. Then, in processing ② it is determined whether or not a resource to be accessed has been occupied, and even in the case where the resource has been occupied the resource can be shared. If the resource can be occupied, when determined to be allowed to occupy the resource, the resource is occupied to obtain an access right, and the processing returns to the application program 9.

Figure 24:
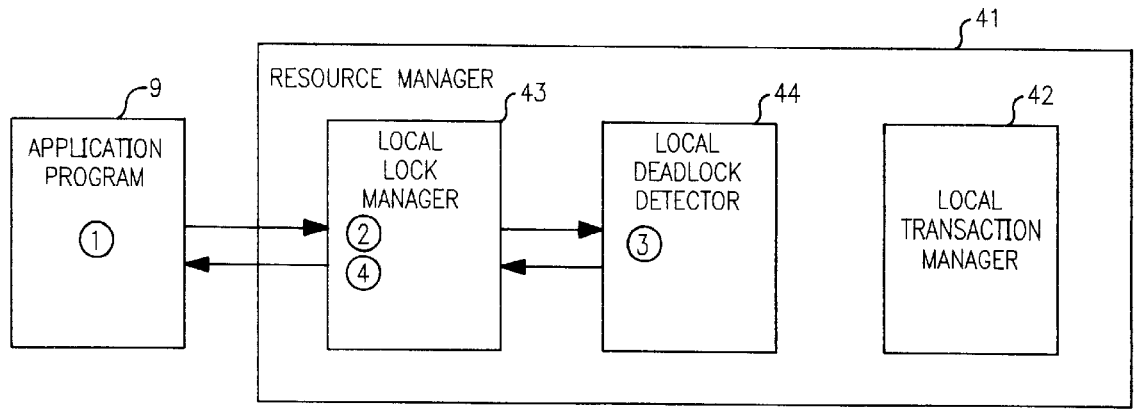
FIG. 24 illustrates a system operation for a resource access request in the second embodiment of the present invention (a case where a wait is set between local transactions or between a local transaction and a transaction branch due to unacceptable occupation)

FIG. 24 illustrates an operation in a case where the occupation is not allowed for a resource access request by the application program. Further, the FIG. 24 illustrates an operation in a case where a wait-state occurs between local transactions or between a local transaction and a transaction branch under the control of a global transaction.

In FIG. 24, the application program 9 issues a resource access request to the resource manager 41 in processing ①, and a local lock manager 43 provided within the resource manager 41 receives this request in processing ②. Then, it is determined whether or not the resource can be occupied. When determined not to be allowed to be occupied, two identifiers constituting wait-for relation are notified to the local lock detector 44.

In the LDD44, transaction identifier notified in the processing ③ is registered with the WFG to determine whether or not a deadlock has been generated. When determined that a deadlock has been generated, a transaction to be canceled is selected. If the transaction thus selected is a local transaction, an instruction is issued to perform the operation to eliminate the deadlock. If the transaction is a global transaction, since the transaction is managed on the transaction manager 30 side, the LDD can do nothing. If no deadlock has been generated, it is determined whether or not this is a wait-state between global transactions and when both or either of them is a local transaction, the processing is put in a wait-state. When the LDD receives an operation command from another transaction which belongs to the same tree, it is determined whether not the direction is retry or a deadlock, and when determined to be retry the processing returns to the LLM43 as retry, while when determined to be a deadlock, the processing returns to the LLM43 as a deadlock. For example, in FIG. 10B, T2–T6 belong to the same tree as T1, and T1, T5, and T6 belong to the same tree as T3. Now, the same tree is referred to signifies linking between an upside and a downside connected by a series of nodes(wait-for relation).

The LLM43, when return code from the LDD in the processing ④ indicates retry, again executes the processing ②, while when the return code indicates a deadlock, the fact that processing is put in a deadlock, is notified to the application program, thus the processing returns to the application program. Otherwise, after the transaction is rolled back, the processing returns to the application program.

Figure 25:
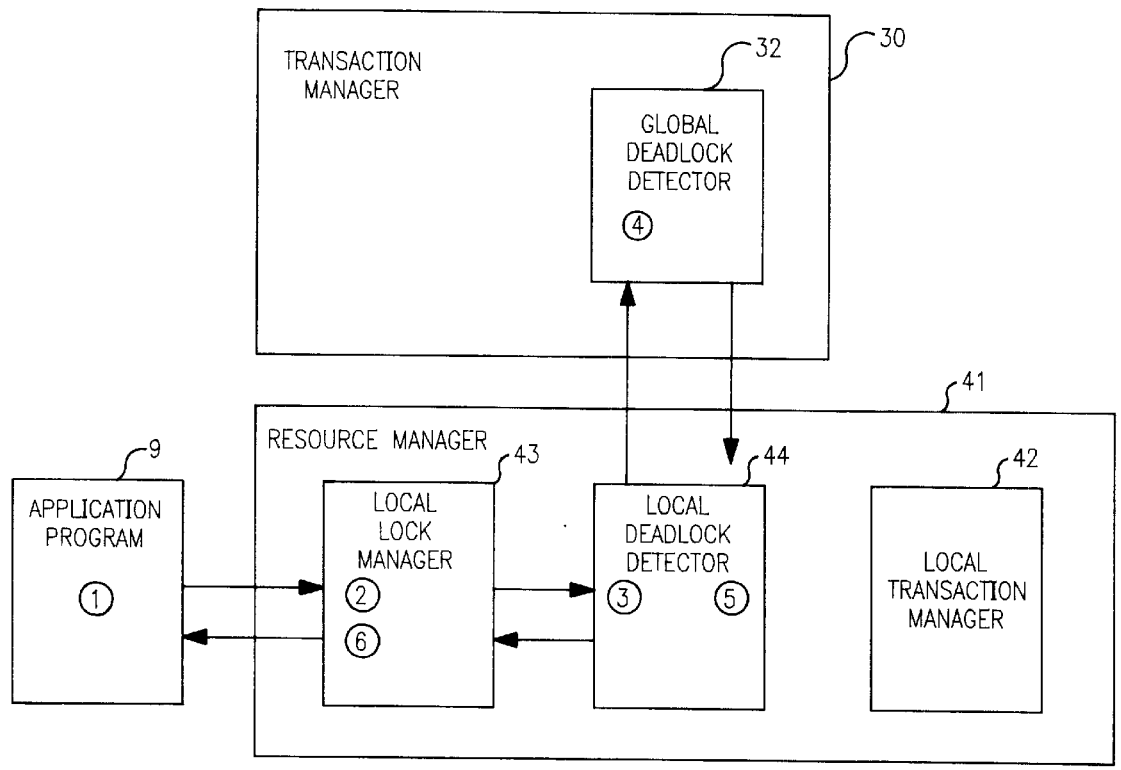
FIG. 25 illustrates a system operation for a resource access request in the second embodiment of the present invention (a case where a wait is set between global transactions due to unacceptable occupation)

Like FIG. 24, FIG. 25 illustrates an operation in the case where an resource has not been allowed to be occupied for a resource access request. However, in contrast to FIG. 24, this case represents a wait-for relation has occurred between transaction branches. In this figure, an operation starting at processing ① and ending at processing ③ can be explained in the same manner as that for FIG. 24. The difference lies in that, in this figure, when the LDD44 determined that no deadlock has been generated in addition to the fact that a wait-state is generated between transaction branches, identifiers of two transaction branches constituting the wait-for relation are notified to a global deadlock detector 32 provided within the transaction manager.

The GDD32, in response to this notification, performs registration with the WFG in processing ④, and makes deadlock determination. If a deadlock has been generated, a transaction to be canceled is selected, and after issuing an operation command to the transaction, the processing is put in a wait-state. While, if the GDD is directed to operate by another transaction belonging to the same tree, the GDD32 determines whether the command indicates retry or a deadlock, and then the processing returns to processing of the LDD44 by specifying the determination result as a return code.

Depending upon whether or not a return code from the GDD32 represents retry or a deadlock, the LDD44 returns to the processing of the LLM43 by specifying the contents as a return code.

The LLM43, when the contents of a return code represents retry, again executes the aforementioned processing ②, and while when a deadlock, notifies the deadlock of the application program 9 or rolls back the transaction, followed by returning the processing to processing by the application program 9.

Figure 26:
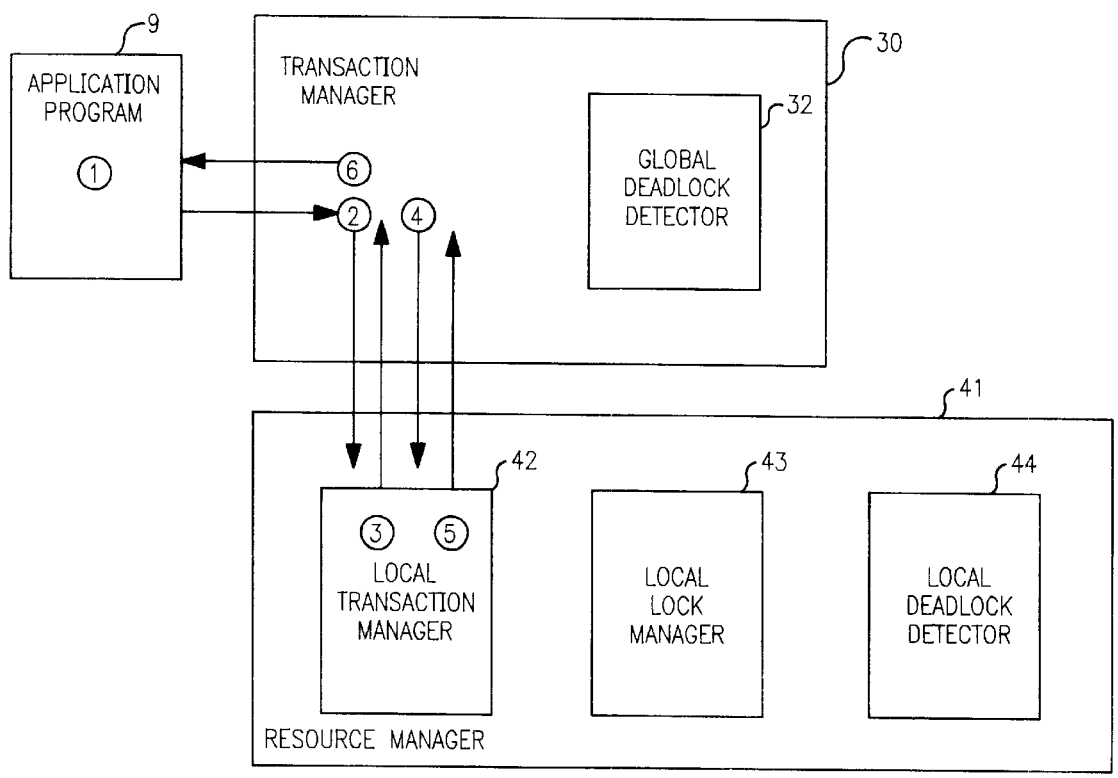
FIG. 26 illustrates a system operation at the end of a transaction in the second embodiment.

FIG. 26 illustrates operation at the end of the transaction, that is, at the transaction end. As aforementioned, when a transaction completes, two phase commitments are performed. First, the application program 9 issues a TX-commit command to the transaction manager 30 in the processing ①, and the TM30 acquires a global transaction identifier by this command in the processing ②. Then the TM30 issues a XA-prepare command to a local transaction manager 42 provided within all the resource managers 41 in which transaction branches of this global transaction exist.

The LTM42 determines whether or not the transaction branch designated in the processing ③ is in a state that can be committed and if it is in that state, the operation returns to processing of the TM(transaction Manager) after setting OK.

If all answers from all resource managers are in the affirmative(YES), the TM30 issues a XA-commit command to the LTM42 in processing ④, and the LTM42 commits the transaction branch in processing ⑤, the processing returns to the TM30. And the processing returns to the application program 9 in processing ⑥. However, if at least one NG exists among the answers from a plurality of resource mangers in which a transaction branch exists, the TM issues a XA-roll-back command to all the resource managers in processing ④, followed by executing roll-back for a global transaction.

In the above description, as the second embodiment, a method of detecting a deadlock is explained in the case where transaction branches under the control of a global transaction branch and local transactions co-exist. This is an operation limited within one processor. However, this method can be applied to a deadlock detecting method in a system constituting a plurality of processors.

Figure 27:
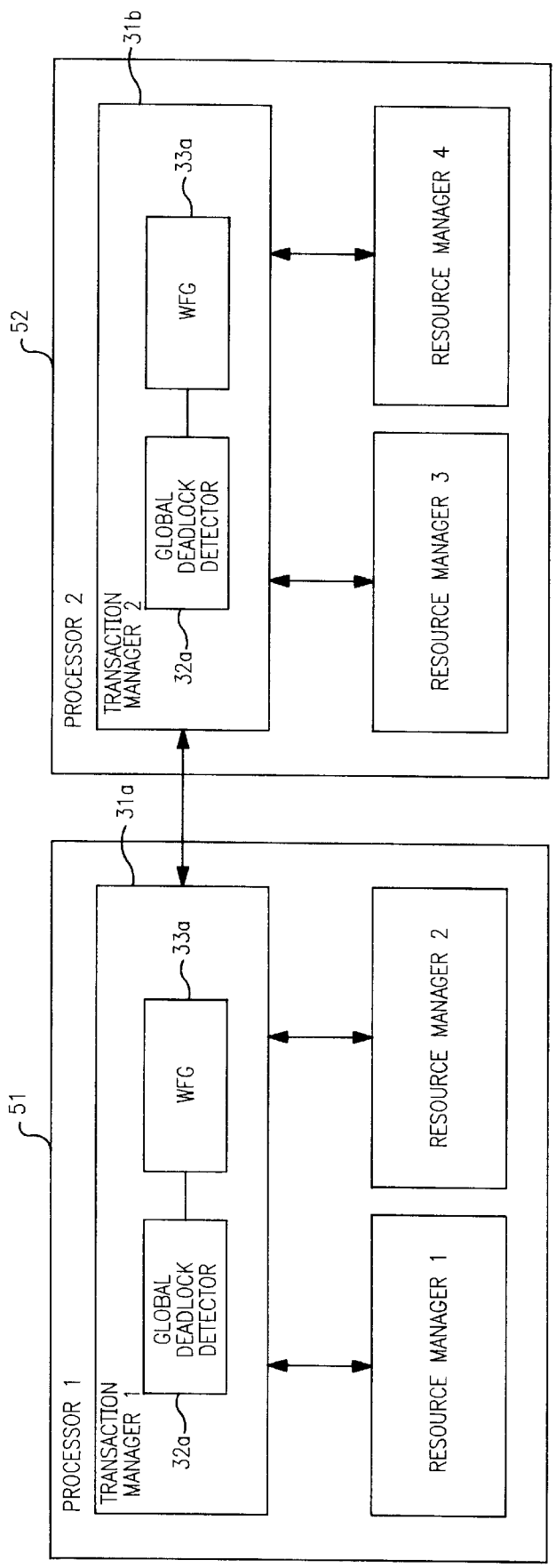
FIG. 27 illustrates deadlock detection in a multiprocessor system.

FIG. 27 shows an example of a configuration of a multiprocessor system to which the deadlock detecting method of the present invention is applied. In this figure, transaction managers 31a and 31b are provided within two processors 51 and 52. The system is configured such that, for example, a global deadlock detector 32a and a WFG management table 33a are provided within a transaction manager 31a. In this system resource managers of different types can be used, and though a transaction manager and a processor of similar types are used, it is acceptable only if unified interfaces are used.

Next, it will be explained how to detect a deadlock with reference to FIG. 27. First when a wait-state is generated between global transactions in a certain processor, a deadlock detection is performed in a transaction manager provided within the processor. If a deadlock is not detected, with respect to the contents of the WFG in a self processor it is determined whether or not a leading node of a graph indicates a global transaction generated in another processor. If the answer is in the affirmative(YES), WFGs in a range from the node newly made to wait to the leading node is transmitted to the processor in which the leading node was generated.

The processor receiving a transmitted WFG checks the leading node within a self processor to determine whether or not the leading node exists in the WFG. When the determination results in no existence in the received WFG, this signifies that no deadlock has been generated. At this time, again the WFG to which the lead in the WFG in a self node is connected and the WFG obtained due to the connection is transmitted to the processor in which the leading global transaction in the WFG provided in the self node was generated.

The above-mentioned transmission and reception of a WFG and a deadlock determination in the processor that receives the WFG are repeated. Thus deadlock detection is repeated until the processor having the leading global transaction generated therein becomes a self processor. By so doing, deadlocks between global transactions can be detected even in a multiprocessor system. In general, 90% or more of deadlocks are generated between global transactions. If the deadlock is formed between two transactions, a deadlock is always detected through one or less communication.

Figure 28A:
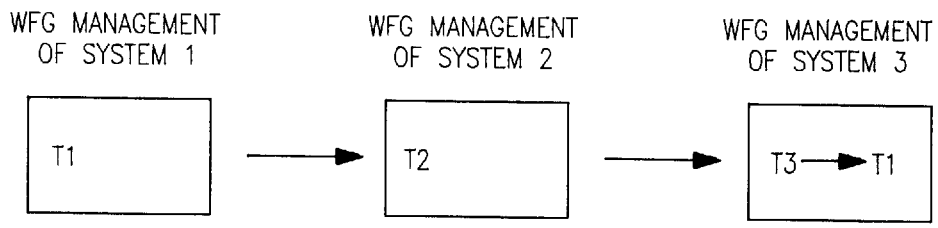
FIG. 28A–28C illustrate an example of deadlock detection in a multi-processor system.
Figure 28B:
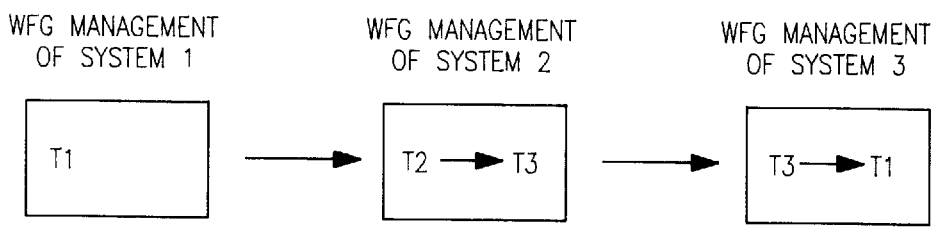
Figure 28C:
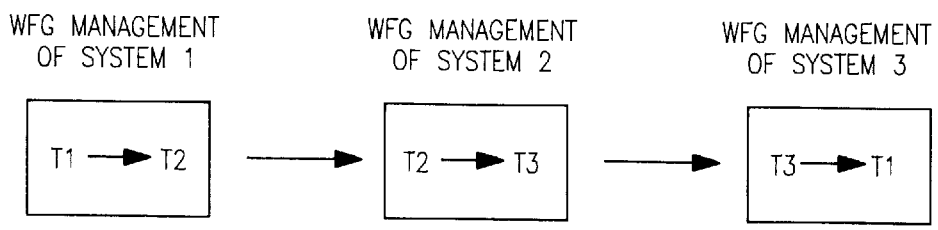

FIGS. 28A to 28C illustrate an example of deadlock detection in a multiprocessor system. In this figure, to explain the example, it is assumed that transactions T1, T2, and T3 are generated in the processors 1, 2, and 3, respectively.

FIG. 28A illustrates the operation in a case where a transaction T3 waits for a transaction T1 in a processor 3. Although the processor 3 sends a WFG having contents that transaction T3 waits for transaction T1 to the processor 1, since transaction T1 waits for nothing in processor 1, it is determined that no deadlock has been generated.

FIG. 28B shows an operation in a processor 2 in a case where consequently a transaction T2 is made to wait for a transaction T3, following the determination described above. First, the WFG (T2→T3) indicating that transaction T2 waits for transaction T3 is sent from processor 2 to processor 3. In addition thereto, the WFG(T2→T3→T1) indicating that transaction T3 waits for transaction T1 and transaction T2 waits for transaction T3 is sent to the processor 1. However, since processor 1 waits for none of the transactions, it is determined that no deadlock is generated.

FIG. 28C illustrates the operation in a case where subsequently transaction T1 results in waiting for transaction T2 in processor 1. First, the WFG is sent from processor 1 to processor 2 that indicates transaction T1 waits for transaction T2. Further, WFG (T1→T2→T3) is sent from processor 2 that indicates transaction T2 waits for transaction T3 and transaction T1 waits for transaction T2 to processor 3. Processor 3, since the leading node T1 of the WFG provided within a self processor exists in the WFG that was sent, it is determined that a deadlock has been generated.

As described above in detail, according to the present invention, deadlocks generated so as to stretch over a plurality of resource managers between global transactions can be detected. By thus detecting, a deadlock state can be eliminated for a short time and hardware resources occupied by the transaction resulting from a deadlock is released from the occupation, thereby significantly contributing to effective use of resources.

What is claimed is:

1. A distributed transaction processing system, comprising:

a transaction manager which collectively manages a plurality of global transactions;

a plurality of resource managers, each managing a part of each global transaction as a transaction branch, said resource managers accessing resources in response to a resource acquisition request by an application program and determines whether it is possible to occupy a resource using a global transaction, and if the resource has been occupied by another global transaction, notifies a global deadlock detector of an identifier of the another global transaction and an identifier of the global transaction concerned with the resource acquisition request; and the global deadlock detector detecting deadlocks stretching over a plurality of resource managers between global transactions which result from wait-for relations regarding occupation of the resources.

2. The distributed transaction processing system according to claim 1, wherein said global deadlock detector further comprises a wait-for graph having wait-for relations, regarding occupying resources between the plurality of global transactions, registered in response to a resource acquisition request issued by an application program for resources under the control of a resource manager, and said global deadlock detector detects global deadlocks using the wait-for graph.

3. The distributed transaction processing system according to claim 1, further comprising:

a local lock manager which determines whether a transaction is a part of a global transaction in response to a resource release request issued from an application program, and which notifies said global deadlock detector of an identifier of the global transaction if the transaction is determined to be a part of a global transaction.

4. The distributed transaction processing system according to claim 1, further comprising:

a local deadlock manager which determines whether a transaction is a part of a global transaction when receiving a dynamic occupation release request as a resource release request before termination of the global transaction from the application program, and notifies said deadlock detector of an identifier of the global transaction if the transaction is determined to be a part of the global transaction.

5. The distributed transaction processing system according to claim 1, further comprising:

a local lock manager which issues an occupation range release request followed by a reduction to said global deadlock detector when receiving an occupation range reduction request for reducing an occupation range which is a part of a resource occupied by the global transaction.

6. The distributed transaction processing system according to claim 1, further comprising:

a local lock manager which determines whether a global transaction with which a resource can be shared is newly generated when receiving a locking strength change request indicating whether a resource occupied by the global transaction is occupied in cooperation with another global transaction from the application program, and issues an occupation release request in response to a global transaction generated by an application program to said global deadlock detector when a global transaction with which the resource can be shared is generated.

7. The distributed transaction processing system according to claim 1, wherein when said global deadlock detector is detecting a deadlock between a plurality of global transactions, a global transaction is selected to be canceled in accordance with criteria specified by a user from among a plurality of global transactions concerned with the deadlock.

8. A distributed transaction processing system, comprising:

a transaction manager which collectively manages a plurality of global transactions;

a plurality of resource managers each managing a part of each global transaction as a transaction branch said resource manages accessing a resource, each resource manager, in response to a resource occupation request issued by an application program, determines whether it is possible to occupy a resource using a global transaction, and if the resource has been occupied by another global transaction, notifies said global deadlock detector of an identifier of the another global transaction and an identifier of the global transaction concerned with the resource acquisition request;

the global deadlock detector detecting a deadlock stretching over a plurality of resource managers between a plurality of global transaction which result from wait-for relations regarding occupation of the resource; and local deadlock detectors which detect a deadlock between transaction branches executed within each of said resource managers or local transactions processed within each of said resource managers only.

9. The distributed transaction processing system according to claim 8, wherein said global transaction deadlock detector is provided with a wait-for graph having wait-for relations, with respect to occupation of resources, registered in response to a resource acquisition request issued by an application program to the resource under the control of a resource manager, said global transaction deadlock detector detects a global deadlock using contents of said wait-for graph.

10. The distributed transaction processing system according to claim 8, wherein said local deadlock detectors, when both of the another transaction and the transaction concerned with a resource acquisition request, whose identifiers have been informed by a local lock managers, are transaction branches of a global transaction, notifies said global deadlock detecting of the two identifiers.

11. A processor for a distributed transaction processing system in a multiprocessor system having a plurality of processors, each processor comprising:

a transaction manager which collectively manages a plurality of global transactions;

a plurality of resource managers which access resources and which manage a part of each global transaction as a transaction branch; and a global deadlock detector for detecting deadlocks, in a subject processor, stretching over a plurality of resource managers, between global transactions which result from wait-for relations related to an occupation of the resources by: notifying a first processor in which a leading global transactions, in a wait-for relation with the subject processor, is generated, of the wait-for relation: receiving, from a second processor the wait-for relation of the second processor; and defining if a leading global transaction in the wait-for relation of the second processor is generated in the subject Processor.

12. The processor according to claim 11, wherein said global deadlock detector is provided with a wait-for graph having wait-or relations, regarding occupation of resources between the plurality of global transactions, registered in response to a resource acquisition request issued by an application program to resources under the control of said resource manager, said global deadlock detector detects global deadlocks using the contents of the wait-for graph.

13. A method of detecting deadlocks in a distributed transaction processing system having a plurality of resource managers and resources, the method comprising the steps of:

collectively managing, using a global transaction manager, a plurality of global transactions stretching over the plurality of resource managers which manage a part of each global transaction as a transaction branch and access the resources;

determining whether it is possible to occupy a resource with a global transaction in response to a resource acquisition request by an application program;

notifying the global transaction manager of an identifier of another global transaction and an identity of the global transaction concerned with the resource acquisition request if the hardware resource has been occupied by the another global transaction; and detecting deadlocks stretching over the plurality of resource managers between global transactions which result from wait-for relations relate to occupation of the hardware resources.

14. A method of detecting deadlocks in a distributed transaction processing system having a plurality of resource mangers and resources, comprising the steps of:

collectively managing, using a global transaction manager, a plurality of global transactions stretching over the plurality of resource managers which manage a part of each global transaction as a transaction branch and access the resources;

determining whether it is possible to occupy a resource with a global transaction in response to a resource acquisition request by an application program;

notifying the global transaction manager of an identifier of another global transaction and an identity of the global transaction concerned with the resource acquisition request if the hardware resource has been occupied by the another global transaction;

detecting deadlocks generated stretching over the plurality of the resource managers between global transactions which result from wait-for relation related to occupation of the resources; and detecting deadlocks between transaction branches executed within each of the resource managers or local transactions processed within each of the resource managers only.

15. A method of detecting deadlocks in a distributed transaction processing system of a multiprocessor system having hardware resources, comprising the steps of:

collectively managing a plurality of global transactions stretching over a plurality of resource managers which manage a part of each global transaction as a transaction branch and access the hardware resources; and detecting deadlocks in a subject processor stretching over a plurality of resource managers between global transactions which result from wait-for relations regarding occupation of the hardware resources by: notifying a first processor in which a leading global transactions, in a wait-for relation with the subject processor, is generated, of the wait-for relation; receiving, from a second processor the wait-for relation of the second processor; and defining if a leading global transaction in the wait-for relation of the second processor is generated in the subject processor.

* * * * *